US011628704B2

(12) United States Patent
Bray et al.

(10) Patent No.: US 11,628,704 B2
(45) Date of Patent: Apr. 18, 2023

(54) METHOD OF OPERATING A COOLING SYSTEM HAVING DUAL INDEPENDENT REFRIGERANT LOOPS FOR PROVIDING COOLING TO A VEHICLE CABIN AND VEHICLE BATTERY

(71) Applicant: Ford Global Technologies, LLC, Dearborn, MI (US)

(72) Inventors: Joseph Allen Bray, Lyon Township, MI (US); Steven L. Lambert, Macomb, MI (US); Luke McDermott, Westerly, RI (US); William Stewart Johnston, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 503 days.

(21) Appl. No.: 16/814,228

(22) Filed: Mar. 10, 2020

(65) Prior Publication Data
US 2021/0283978 A1    Sep. 16, 2021

(51) Int. Cl.
*B60H 1/00*    (2006.01)
*B60H 1/32*    (2006.01)
(Continued)

(52) U.S. Cl.
CPC ..... *B60H 1/00278* (2013.01); *B60H 1/00885* (2013.01); *B60H 1/323* (2013.01);
(Continued)

(58) Field of Classification Search
None
See application file for complete search history.

(56) References Cited

U.S. PATENT DOCUMENTS 10,046,617 B2    8/2018    Smith et al.
2009/0317697 A1    12/2009   Dogariu et al.
(Continued)

FOREIGN PATENT DOCUMENTS

WO    201810525 A1    6/2018

OTHER PUBLICATIONS

M. Mousavi, S. Hoque, S. Rahnamayan, I. Dincer and G. F. Naterer, "Optimal design of an air-cooling system fora Li-Ion battery pack in Electric Vehicles with a genetic algorithm," 2011 IEEE Congress of Evolutionary Computation (CEC), 2011, pp. 1848-1855, doi: 10.1109/CEC.2011.5949840.*

*Primary Examiner* — Mohammad J Rahman
(74) *Attorney, Agent, or Firm* — Vichit Chea; Price Heneveld LLP

(57) ABSTRACT

A method of operating a cooling system for a vehicle including providing a cooling system including a coolant loop having a coolant valve, a first refrigerant loop having a first compressor and a first chiller configured to exchange heat with the coolant loop, a second refrigerant loop having a second compressor and a second chiller configured to exchange heat with the coolant loop, and a cooling system controller operably coupled to the first compressor, the second compressor, and the coolant valve. The coolant valve is configured to selectively direct or prevent the flow of coolant between the battery and each of the first chiller and the second chiller. The method further includes operating the cooling system in one of a second chiller only mode, a first chiller only mode, an air conditioning (AC) only mode, a first refrigerant loop only mode, and a dual refrigerant loop mode.

16 Claims, 15 Drawing Sheets

(51) Int. Cl.
*H01M 10/625* (2014.01)
*H01M 10/663* (2014.01)
*H01M 10/6568* (2014.01)

(52) U.S. Cl.
CPC ........ *B60H 1/3205* (2013.01); *H01M 10/625* (2015.04); *H01M 10/6568* (2015.04); *H01M 10/663* (2015.04); *B60H 2001/00307* (2013.01); *H01M 2220/20* (2013.01)

(56) References Cited

U.S. PATENT DOCUMENTS

| | | | |
|---|---|---|---|
| 2010/0009246 A1 | 1/2010 | Maitre et al. | |
| 2012/0234518 A1 | 9/2012 | Brodie et al. | |
| 2014/0182832 A1* | 7/2014 | Styles | B60H 1/00278 165/42 |
| 2015/0013367 A1* | 1/2015 | Carpenter | F25B 49/02 62/222 |
| 2016/0131016 A1* | 5/2016 | Mehravaran | F02B 29/0443 123/41.1 |
| 2017/0008375 A1* | 1/2017 | Blatchley | H01M 10/615 |
| 2017/0008407 A1* | 1/2017 | Porras | B60H 1/00278 |
| 2017/0358833 A1* | 12/2017 | Jalilevand | B60H 1/00885 |
| 2018/0097266 A1* | 4/2018 | Jalilevand | B60H 1/3205 |
| 2018/0111443 A1 | 4/2018 | Kim et al. | |
| 2018/0281556 A1* | 10/2018 | Koberstein | B60L 58/26 |
| 2019/0063348 A1* | 2/2019 | Xiao | F02D 11/105 |
| 2020/0158380 A1* | 5/2020 | Suzuki | F25B 25/005 |
| 2021/0213798 A1* | 7/2021 | Mackenzie | H01M 10/613 |
| 2021/0221250 A1* | 7/2021 | Hiratsuka | B60L 7/12 |

* cited by examiner

| Main Compressor Limit (RPM) | | Vehicle Speed (kph) | | | | | |
|---|---|---|---|---|---|---|---|
| | | 0-9 | 10-14 | 15-47 | 48-63 | 64-79 | 80+ |
| Blower Speed | 1 | 4800 | 4800 | 8600 | 8600 | 11000 | 11000 |
| | 2 | 4800 | 4800 | 8600 | 8600 | 11000 | 11000 |
| | 3 | 5500 | 5500 | 8600 | 11000 | 11000 | 11000 |
| | 4 | 6500 | 6500 | 8600 | 11000 | 11000 | 11000 |
| | 5 | 8600 | 8600 | 8600 | 11000 | 11000 | 11000 |
| | 6 | 8600 | 8600 | 8600 | 11000 | 11000 | 11000 |
| | 7 | 8600 | 8600 | 8600 | 11000 | 11000 | 11000 |

FIG. 10

| Main Compressor Limit Modifier | Battery Coolant Temp (degrees Celsius) | | | | | |
|---|---|---|---|---|---|---|
| | 0-49 | 50-51 | 52-53 | 54-55 | 56-59 | 60+ |
| Main Compressor Limit Increase (RPM) | +0 | +100 | +500 | +2000 | +3500 | +5000 |

FIG. 11

METHOD OF OPERATING A COOLING SYSTEM HAVING DUAL INDEPENDENT REFRIGERANT LOOPS FOR PROVIDING COOLING TO A VEHICLE CABIN AND VEHICLE BATTERY

FIELD OF THE DISCLOSURE

The present disclosure generally relates to a vehicle, and more particularly to a vehicle having a cooling system for providing cooling to a cabin of the vehicle and a battery of the vehicle.

BACKGROUND OF THE DISCLOSURE

Vehicles typically include a cooling system for exchanging heat with air entering a cabin of the vehicle. Vehicles may also include a cooling system for exchanging heat with one or more powertrain components to prevent the overheating of the powertrain components. In some cases it may be desirable to provide a cooling system configured to provide cooling to each of the air entering the cabin of the vehicle and the powertrain components of the vehicle.

SUMMARY OF THE DISCLOSURE

According to a first aspect of the present disclosure, a method of operating a cooling system for a vehicle includes providing the cooling system having a coolant loop configured to exchange heat with a battery, a first refrigerant loop having a first compressor, an evaporator configured to exchange heat with a cabin of the vehicle, an evaporator shutoff valve, a first chiller configured to exchange heat with the coolant loop, and a first chiller shutoff valve. The method of operating a cooling system for a vehicle further includes a second refrigerant loop having a second compressor and a second chiller configured to exchange heat with the coolant loop. The coolant loop includes a coolant valve for selectively directing or preventing the flow of a coolant between the battery and each of the first chiller and the second chiller. The method further includes providing a cooling system controller operably coupled to the first compressor, the second compressor, the coolant valve, the evaporator shutoff valve, and the first chiller shutoff valve; operating a cooling system for a vehicle determining cabin cooling needs and battery cooling needs; adjusting the coolant valve to selectively direct or prevent the flow of the coolant to at least one of the first chiller and the second chiller; and modifying a speed of at least one of the first compressor and the second compressor to satisfy the cabin cooling needs and the battery cooling needs.

Embodiments of the first aspect of the present disclosure can include any one or a combination of the following features:
- determining cooling capabilities of each of the first refrigerant loop and the second refrigerant loop; and comparing the battery cooling needs the cabin needs to the cooling capabilities of the first refrigerant loop and the second refrigerant loop;
- adjusting the coolant valve to direct coolant to the second chiller and prevent the flow of coolant to the first chiller when cabin cooling is not needed and the battery cooling needs are less than the cooling capability of the second refrigerant loop;
- adjusting the coolant valve to prevent the flow of the coolant to the first chiller and the second chiller and adjusting the evaporator shutoff valve and the first chiller shutoff valve to direct the flow of refrigerant in the first refrigerant loop to the evaporator and prevent the flow of refrigerant to the first chiller when cabin cooling is needed and battery cooling is not needed;
- adjusting the coolant valve to direct the coolant to the first chiller and prevent the flow of the coolant to the second chiller when cabin cooling is needed and the combined cooling needs of the cabin and the battery are less than the cooling capability of the first refrigerant loop;
- adjusting the coolant valve to direct the coolant to the first chiller and the second chiller when the combined cooling needs of the cabin and the battery exceed the cooling capability of each of the first refrigerant loop and the second refrigerant loop;
- determining noise, vibration, and harshness (NVH) limits for the first compressor and the second compressor and modifying the speed of the first compressor and the second compressor according to the NVH limits; and
- determining a combined coefficient of performance (COP) optimization for the first compressor and the second compressor and modifying the speed of the first compressor and the second compressor according to the combined COP optimization.

According to a second aspect of the present disclosure, a method of operating a cooling system for a vehicle includes providing the cooling system having a coolant loop configured to exchange heat with a battery; a first refrigerant loop having a first compressor, an evaporator configured to exchange heat with a cabin of the vehicle, an evaporator shutoff valve, a first chiller configured to exchange heat with the coolant loop, and a first chiller shutoff valve. A second refrigerant loop having a second compressor and a second chiller configured to exchange heat with the coolant loop. The coolant loop includes a coolant valve for selectively directing or preventing the flow of a coolant between the battery and each of the first chiller and the second chiller. The method further includes providing a cooling system controller operably coupled to the first compressor, the second compressor, the coolant valve, the evaporator shutoff valve, and the first chiller shutoff valve; operating a cooling system for a vehicle further comprising determining cabin cooling needs and battery cooling needs; operating the cooling system in one of a second chiller only mode, a first chiller only mode, an air conditioning (AC) only mode, a first refrigerant loop only mode, and a dual refrigerant loop mode; and modifying a speed of at least one of the first compressor and the second compressor to satisfy the cabin cooling needs and the battery cooling needs.

Embodiments of the second aspect of the present disclosure can include any one or a combination of the following features:
- operating the cooling system in the first refrigerant loop only mode; determining if additional cooling is needed for at least one of the cabin and the battery; determining a maximum speed of the first compressor; and adjusting the speed of the first compressor up to the maximum speed of the first compressor to satisfy the cabin cooling needs and the battery cooling needs;
- the maximum speed of the first compressor is determined based on a speed of a blower and a speed of said vehicle;
- determining an absolute limit for the speed of the first compressor.
- the absolute limit is determined based on at least one of a predetermined limit, a head pressure limit, and a voltage limit;

increasing the maximum speed of the first compressor up to the absolute limit.

providing a coolant temperature sensor; and receiving a coolant temperature reading from the coolant temperature sensor; and increasing the maximum speed of the first compressor based on the received coolant temperature reading; and determining a cooling capability of the first refrigerant loop with the first compressor operating at the absolute limit; determining a combined cooling need of the cabin and the battery; comparing the cooling capability of the first refrigerant loop with the combined cooling need; and operating the cooling system in the dual refrigerant loop mode when the combined cooling need exceeds the cooling capability of the first refrigerant loop.

According to a third aspect of the present disclosure, a method of operating a cooling system for a vehicle includes providing the cooling system having a coolant loop configured to exchange heat with a battery; a first refrigerant loop comprising a first compressor, an evaporator configured to exchange heat with a cabin of the vehicle, and a first chiller configured to exchange heat with the coolant loop; and a second refrigerant loop comprising a second compressor and a second chiller configured to exchange heat with the coolant loop. The coolant loop includes a coolant valve for selectively directing or preventing the flow of a coolant between the battery and each of the first chiller and the second chiller. The method further includes operating a cooling system for a vehicle further comprising providing a cooling system controller operably coupled to the first compressor, the second compressor, and the coolant valve; determining cabin cooling needs and battery cooling needs; operating the cooling system in a dual refrigerant loop mode; modifying a speed of at least one of the first compressor and the second compressor to satisfy the cabin cooling needs and the battery cooling needs; determining if additional cooling is needed for at least one of the cabin and the battery; and determining if the additional cooling is for a cabin cooling request or for a battery cooling request.

Embodiments of the third aspect of the present disclosure can include any one or a combination of the following features:

adjusting the speed of the first compressor to satisfy the cabin cooling needs when the additional cooling is for a cabin cooling request;

determining the speed of the second compressor corresponding to an optimal coefficient of performance (COP); determining if the second compressor is operating at or above the speed corresponding to the optimal COP; adjusting the speed of the second compressor up to the speed corresponding to the optimal COP when the additional cooling is for a battery cooling request and the second compressor is operating below the speed corresponding to the optimal COP; and determining the speed of the second compressor corresponding to an optimal coefficient of performance (COP); determining if the second compressor is operating at or above the speed corresponding to the optimal COP; determining a combined COP optimization for the first compressor and the second compressor; and adjusting the speed of the first compressor and the second compressor according to the combined COP optimization when the additional cooling is for a battery cooling request and the second compressor is operating at or above the speed corresponding to the optimal COP.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 10 is a table for determining a maximum compressor speed of a first compressor of the cooling system of FIG. 2;

FIG. 11 is a table for determining a maximum compressor speed modification of a first compressor of the cooling system of FIG. 2;

DETAILED DESCRIPTION OF THE EMBODIMENTS

Figure 1:
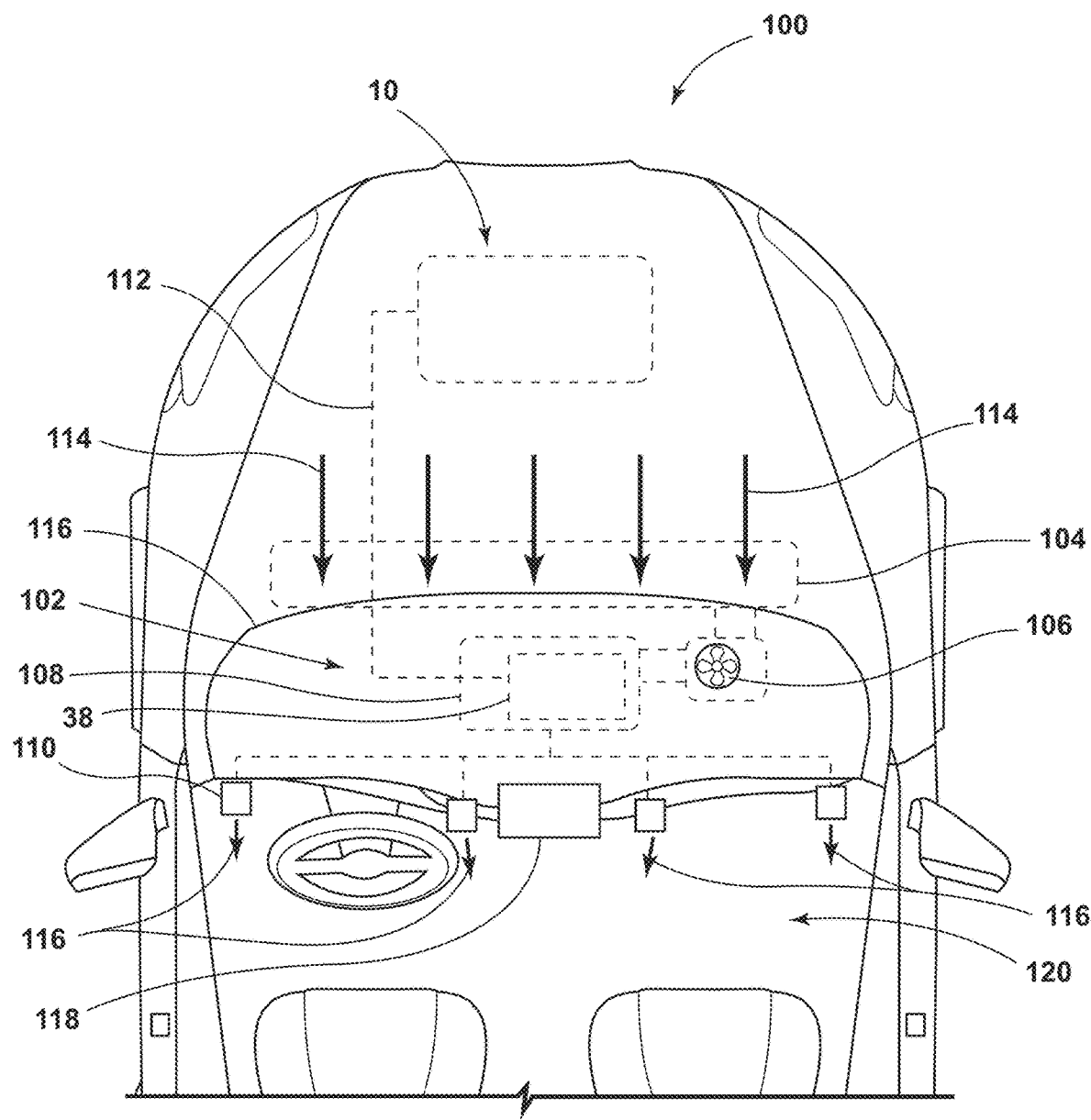
FIG. 1 is a top partially schematic view of a vehicle including a heating, ventilation, and air conditioning (HVAC) system and a cooling system.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring generally to FIGS. 1-16, a cooling system 10 for a vehicle 100 is provided. In some embodiments, the vehicle 100 is an electric vehicle configured to be driven by an electric motor and a battery 20. Cooling of a cabin 120 of the vehicle 100 and the battery 20 may be provided by the cooling system 10. The cooling system 10 includes a first refrigerant loop 14 comprising a first compressor 30 and a second refrigerant loop 16 comprising a second compressor 44. The first compressor 30 and the second compressor 44 may be operated independently by a cooling system controller 50 such that the first compressor 30 may be operated at a first speed and the second compressor 44 may be operated at a second speed. The first speed may be different than the second speed. The first refrigerant loop 14 is configured to provide cooling to the cabin 120 via an evaporator 38 and to the battery 20 via a first chiller 24. The second refrigerant loop 16 is configured to provide cooling to the battery 20 via a second chiller 26. According to various aspects, the cooling system controller 50 may operate the cooling system 10 in a variety of modes including, but not limited to, a second chiller only mode, a first chiller only mode, an air conditioning (AC) only mode, a first refrigerant loop only mode, and a dual refrigerant loop mode to satisfy the cooling needs of the cabin 120 and the battery 20.

Referring now to FIG. 1, a vehicle 100 is provided. In various examples, the vehicle 100 is a wheeled motor vehicle 100, which may be a sedan, a sport utility vehicle, a truck, a van, a crossover, and/or other styles of vehicles. The vehicle 100 may be a manually operated vehicle (e.g., with a human driver), a fully autonomous vehicle (e.g., no human driver), or a partially autonomous vehicle (e.g., may be operated with or without a human driver). Additionally, the vehicle 100 may be utilized for personal and/or commercial purposes, such as ride-providing services (e.g., chauffeuring) and/or ride-sharing services.

Typically, the vehicle 100 includes an HVAC system 102 for providing comfort to one or more passengers in a cabin 120 of the vehicle 100. Typically, HVAC intake air 114 enters the cabin 120 of the vehicle 100 via a cowl 104 located near a windshield of the vehicle 100. A blower 106 is provided to help move the HVAC intake air 114 through the HVAC system 102. From the blower 106, the HVAC intake air 114 moves to an HVAC case 108 where the air is heated and/or cooled to a desired temperature to produce conditioned air 116. The conditioned air 116 is then directed to the cabin 120 through at least one duct 110.

In various embodiments, the HVAC system 102 includes a plurality of ducts 110. Typically, the HVAC system 102 includes one or more panel ducts, one or more defrost ducts, and one or more floor ducts. In some embodiments, the HVAC system 102 may also include one or more rear HVAC ducts 110 (e.g., for directing air to a second seating row and/or a third seating row). In various embodiments, the HVAC system 102 is configured to operate in a plurality of air distribution modes including, but not limited to, panel mode, defrost mode, floor mode, driver-only mode, and combinations thereof.

The HVAC system 102 further comprises an HVAC controller 118. Typically the HVAC controller 118 is operably coupled to one or more user controls. In various embodiments, the HVAC controller 118 is configured to receive one or more signals relating to various HVAC settings including, but not limited to, a cabin air temperature setting (e.g., driver side set temperature and/or passenger side set temperature), driver/passenger synchronization settings (i.e., sync mode), blower speed, air distribution mode, recirculation mode, air conditioning (AC) request status (i.e., AC compressor on/off state), rear defroster setting, seat heater settings, automatic temperature control settings, rear HVAC settings (e.g., rear set temperature and rear blower speed), and combinations thereof.

In various embodiments, the HVAC controller 118 is configured to receive at least one input from one or more HVAC sensors. Contemplated HVAC sensors include, but are not limited to, a sun load sensor, a cabin air temperature sensor, a humidity sensor, and air quality sensor, a blend door position sensor, a recirculation door position sensor, an evaporator temperature sensor 56, a refrigerant pressure sensor, a refrigerant temperature sensor, a discharge air temperature sensor, an ambient air temperature sensor, and combinations thereof.

Typically, the vehicle 100 also includes a cooling system 10 for cooling the HVAC intake air 114 and/or one more powertrain components (e.g., an internal combustion engine or a battery/motor combination). Typically, the cooling system 10 includes an evaporator 38 disposed within the HVAC case 108 for cooling the HVAC intake air 114. The cooling system 10 may further include one more refrigerant lines 112 for directing refrigerant to and from the evaporator 38. In some embodiments, the cooling system 10 may further include a heater core disposed within the HVAC case 108 for heating the HVAC intake air 114. The cooling system 10 may also include one or more coolant lines fluidly coupled to the heater core for directing coolant to and from the heater core.

Figure 2:
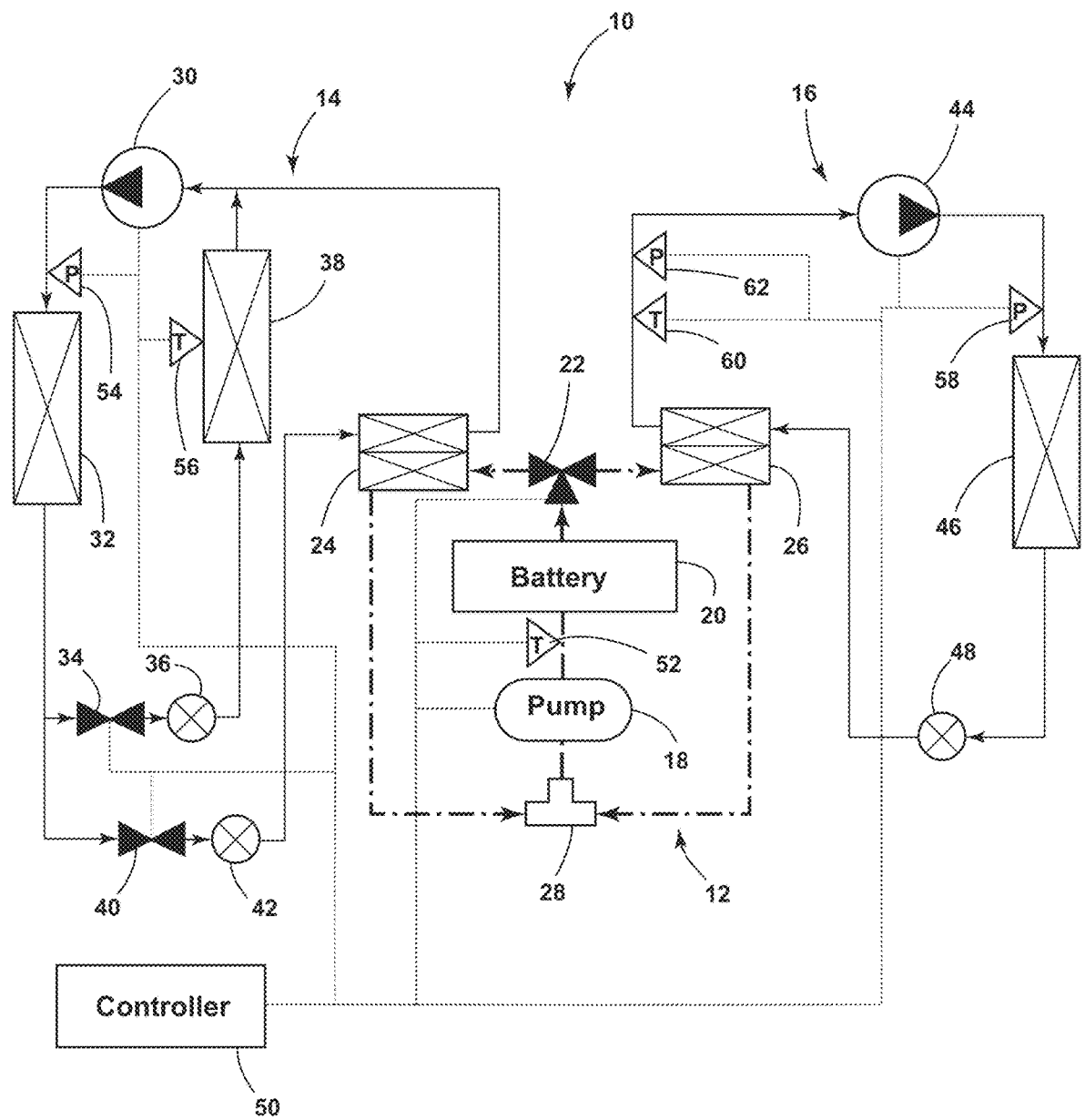
FIG. 2 is a schematic view of the cooling system of FIG. 1.

Referring now to FIG. 2, the cooling system 10 includes a coolant loop 12, a first refrigerant loop 14, and a second refrigerant loop 16. In various embodiments, the coolant loop 12 is configured to exchange heat with a battery 20 and or various heat producing electronic devices (e.g., light detection and ranging (LIDAR) systems, infotainment systems, electronic control units (ECUs), power inverters, and combinations thereof).

Typically, the coolant loop 12 includes a pump 18 for circulating coolant through the coolant loop 12. Typically, the coolant comprises an ethylene glycol solution, but it may comprise any suitable heat exchanging medium. The coolant exchanges heat with the battery 20 and/or the heat producing electronic devices. From the battery 20, the coolant flows to a valve 22 where it is directed to at least one of a first chiller 24 and a second chiller 26. In some embodiments, the valve 22 is a proportional valve. The valve 22 may be configured to selectively control the flow of the coolant to the first chiller 24 and the second chiller 26. In various embodiments, the coolant flow rate to the first chiller 24 and/or the second chiller 26 is variable. The coolant flow rate from the valve 22 to the first chiller 24 and from the valve 22 to the second chiller 26 is independently controllable.

The coolant flows through a coolant flow path of the first chiller 24 and/or the second chiller 26 and is configured to exchange heat with a refrigerant of the first refrigerant loop 14 and/or the second refrigerant loop 16 respectively. The first chiller 24 and/or the second chiller 26 each comprise a refrigerant-to-coolant heat exchanger for cooling the coolant from the coolant loop 12. Typically, the first chiller 24 and the second chiller 26 each comprise a plate heat exchanger, but other suitable heat exchangers (e.g., shell-and-tube heat exchangers) are contemplated. The first chiller 24 and the second chiller 26 may comprise plate heat exchangers having a desired number of plates suitable for exchanging a desired amount of heat. In some embodiments, the first chiller 24 comprises a different number of plates than the second chiller 26. For example, the first chiller 24 comprises 28 plates while the second chiller 26 comprises 40 plates.

The coolant from the first chiller 24 and the coolant from the second chiller 26 converge at fitting 28 prior to returning to the pump 18. In this regard, in some embodiments, the first chiller 24 and the second chiller 26 are fluidly coupled in parallel. In some embodiments, the first chiller 24 and the second chiller 26 may be arranged in series such that the coolant passes through one of the first chiller 24 and the second chiller 26 prior to passing through the other of the first chiller 24 and the second chiller 26.

The first refrigerant loop 14 includes a first compressor 30 for circulating refrigerant through the first refrigerant loop 14. The first compressor 30 includes a suction port and a discharge port. In some embodiments, the first compressor 30 is driven by an electric motor. In other embodiments, the first compressor 30 may be driven mechanically. In embodiments where the first compressor 30 is driven mechanically, the first compressor 30 may be variable (e.g., via adjustments in duty cycle and/or compressor displacement) such that the flow of refrigerant through the first compressor 30 may be increased/decreased to satisfy the cooling demands of the system. Typically, the suction port of the first compressor 30 is configured to receive low-pressure superheated vapor refrigerant. The first compressor 30 then compresses the low-pressure superheated vapor refrigerant and a high-pressure superheated vapor refrigerant leaves the discharge port of the first compressor 30.

A first condenser 32 is included in the first refrigerant loop 14 for exchanging heat from the refrigerant. A refrigerant inlet of the first condenser 32 is configured to receive the high-pressure superheated vapor refrigerant from the discharge port of the first compressor 30. The first condenser 32 then exchanges heat between the high-pressure superheated vapor refrigerant and the outside air. Typically, the refrigerant leaves a refrigerant outlet of the first condenser 32 as a high-pressure subcooled liquid refrigerant.

Typically, the first condenser 32 is a refrigerant-to-air heat exchanger for exchanging heat directly with the outside air. However, in some embodiments, the first condenser 32 is a water-cooled condenser and is configured to exchange heat between the refrigerant and the outside air via a coolant or similar heat exchange medium. In some embodiments, where the first condenser 32 is a refrigerant-to-air heat exchanger, the first condenser 32 may be positioned on the vehicle 100 in a position (e.g., in a front portion of the vehicle) likely to direct outside air over an exterior surface of the first condenser 32. The vehicle 100 may additionally include one or more air guides for directing air over the exterior surface of the first condenser 32. For example, in some embodiments, the first condenser 32 is a tube-and-fin heat exchanger positioned behind a front grille of the vehicle 100, and the vehicle 100 includes one or more condenser air guides disposed around the edges of the grille and between the grille and the first condenser 32 for directing outside air over an exterior surface of the first condenser 32 while the vehicle 100 is in motion. In some embodiments, the one or more condenser air guides include shutters that can be closed when heat exchange between the refrigerant and the outside air is not desired. In some embodiments, the vehicle 100 includes a cooling fan positioned proximate the first condenser 32 for directing air over the exterior surface of the first condenser 32.

A first portion of the refrigerant flows from the first condenser 32 to an evaporator loop. The evaporator loop includes an evaporator shutoff valve 34, an evaporator expansion device 36 and an evaporator 38. A second portion of the refrigerant flows from the first condenser 32 to a first chiller loop. The first chiller loop includes a first chiller shutoff valve 40, a first chiller expansion device 42, and the first chiller 24. The evaporator shutoff valve 34 and the first chiller shutoff valve 40 are configured to be selectively opened or closed to direct refrigerant through the evaporator loop and/or the first chiller loop.

The evaporator shutoff valve 34 is open when cooling of the cabin 120 (FIG. 1) is desired. Accordingly, the first portion of refrigerant flows through the evaporator shutoff valve 34 and is directed to the first evaporator expansion device 36. The evaporator expansion device 36 is disposed proximate to the evaporator 38 and is configured to decrease the pressure of the first portion of refrigerant entering the evaporator loop. Typically, the first portion of refrigerant enters the evaporator expansion device 36 as a high-pressure subcooled liquid refrigerant. The first portion of refrigerant is allowed to expand as it passes through the evaporator expansion device 36 and leaves as a low-pressure liquid refrigerant and vapor refrigerant mixture. Suitable expansion devices may include, but are not limited to, thermal expansion valves, manual expansion valves, capillary tubes, automatic valves, electronic expansion valves, and float valves. In some embodiments, the evaporator expansion device 36 is an electronic expansion valve. In some embodiments, the evaporator expansion device 36 is a thermal expansion valve with a sensing bulb disposed downstream from the evaporator 38 for maintaining a desired superheat. In some embodiments, the evaporator expansion device 36 functions as a shutoff valve in lieu of the evaporator shutoff valve 34 and is capable of being fully closed to prevent the flow of the first portion of refrigerant through the evaporator 38 when cooling of the cabin 120 (FIG. 1) of the vehicle 100 (FIG. 1) is not desired.

The first portion of refrigerant is directed from the evaporator expansion device 36 to the evaporator 38. The evaporator 38 exchanges heat between the refrigerant and HVAC intake air 114 entering the passenger compartment of the vehicle 100. As the first portion of refrigerant is heated, the low-pressure liquid refrigerant and vapor refrigerant mixture increases in substantially latent heat to become a low-pressure superheated vapor refrigerant.

Typically, the evaporator 38 is a refrigerant-to-air heat exchanger positioned within a mixing chamber of the HVAC case 108 for exchanging heat with the HVAC intake air 114. The HVAC intake air 114 passes through the HVAC case 108 where it is directed by one or more temperature blend doors over an exterior surface of the evaporator 38 and/or the heater core for cooling/heating the HVAC intake air 114 to a desired temperature to produce conditioned air 116. The conditioned air 116 is then directed to flow through one or more ducts 110 to enter the cabin 120 of the vehicle 100. After the first portion of refrigerant flows through the evaporator 38 where it exchanges heat with the HVAC intake air 114, the first portion of refrigerant is directed back to the first compressor 30.

The first chiller shutoff valve 40 is open when battery cooling is desired allowing the second portion of refrigerant to flow through the first chiller loop. Accordingly, the second portion of refrigerant is directed from the first chiller shutoff valve 40 to the first chiller expansion device 42. The first chiller expansion device 42 is disposed proximate to the first chiller 24 and is configured to decrease the pressure of the second portion of refrigerant entering the first chiller loop. Typically, the second portion of refrigerant enters the first chiller expansion device 42 as a high-pressure subcooled liquid refrigerant. The second portion of refrigerant is allowed to expand as it passes through the first chiller expansion device 42 and leaves as a low-pressure liquid refrigerant and vapor refrigerant mixture. Suitable expansion devices may include, but are not limited to, thermal expansion valves, manual expansion valves, capillary tubes, automatic valves, electronic expansion valves, and float valves. In some embodiments, the first chiller expansion device 42 is an electronic expansion valve. In some embodiments, the first chiller expansion device 42 is a thermal expansion valve with a sensing bulb disposed downstream from the first chiller 24 for maintaining a desired superheat. In some embodiments, the first chiller expansion device 42 functions as a shutoff valve in lieu of the first chiller shutoff valve 40 and is capable of being fully closed to prevent the flow of the second portion of refrigerant through the first chiller 24.

The first chiller 24 is configured to exchange heat between the second portion of refrigerant in the first refrigerant loop and the coolant of the coolant loop 12. As the second portion of refrigerant is heated, the low-pressure liquid refrigerant and vapor refrigerant mixture increases in substantially latent heat to become a low-pressure superheated vapor refrigerant. Typically, the chiller includes a refrigerant inlet and a refrigerant outlet as well as a coolant inlet and a coolant outlet. In some embodiments, the first chiller 24 comprises a plate heat exchanger having a plurality of stacked plates. The plates may be configured to form a plurality of alternating flow channels between the plurality of stacked plates such that the second portion of refrigerant and the coolant may flow through alternating channels and exchange heat through the plurality of stacked plates. The size of the first chiller (e.g., the number of stacked plates and the surface area of the plates) may be varied to achieve a desired amount of heat transfer between the second portion of refrigerant and the coolant. After exchanging heat with the coolant via the first chiller 24, the second portion of refrigerant is directed back to the first compressor 30.

The second refrigerant loop 16 includes a second compressor 44 for circulating refrigerant through the second refrigerant loop 16. The second compressor 44 includes a suction port and a discharge port. In some embodiments, the second compressor 44 is driven by an electric motor. In other embodiments, the second compressor 44 may be driven mechanically. In embodiments where the second compressor 44 is driven mechanically, the second compressor 44 may be variable (e.g., via adjustments in duty cycle and/or compressor displacement) such that the flow of refrigerant through the second compressor 44 may be increased/decreased to satisfy the cooling demands of the system. Typically, the suction port of the second compressor 44 is configured to receive low-pressure superheated vapor refrigerant. The second compressor 44 then compresses the low-pressure superheated vapor refrigerant and a high-pressure superheated vapor refrigerant leaves the discharge port of the second compressor 44.

A second condenser 46 is included in the second refrigerant loop 16 for exchanging heat from the refrigerant. A refrigerant inlet of the second condenser 46 is configured to receive the high-pressure superheated vapor refrigerant from the discharge port of the second compressor 44. The second condenser 46 then exchanges heat between the high-pressure superheated vapor refrigerant and the outside air. Typically, the refrigerant leaves a refrigerant outlet of the second condenser 46 as a high-pressure subcooled liquid refrigerant.

Typically, the second condenser 46 is a refrigerant-to-air heat exchanger for exchanging heat directly with the outside air. In some embodiments, the second condenser 46 is a water-cooled condenser and is configured to exchange heat between the refrigerant and coolant. In some embodiments, where the second condenser 46 is a refrigerant-to-air heat exchanger, the second condenser 46 may be positioned on the vehicle 100 in a position (e.g., in a front portion of the vehicle) likely to direct outside air over an exterior surface of the second condenser 46. The vehicle 100 may additionally include one or more air guides for directing air over the exterior surface of the second condenser 46. For example, in some embodiments, the second condenser 46 is a tube-and-fin heat exchanger positioned behind a front grille of the vehicle, and the vehicle 100 includes one or more air guides disposed around the edges of the grille and between the grille and the second condenser 46 for directing outside air over an exterior surface of the second condenser 46 while the vehicle 100 is in motion. In some embodiments, the one or more air guides include shutters that can be closed when heat exchange between the refrigerant and the outside air is not desired. In some embodiments, the vehicle 100 includes a cooling fan positioned proximate the second condenser 46 for directing air over the exterior surface of the second condenser 46.

The refrigerant in the second refrigerant loop 16 is directed from the second condenser 46 to a second chiller expansion device 48. The second chiller expansion device 48 is disposed proximate to the second chiller 26 and is configured to decrease the pressure of the refrigerant of the second refrigerant loop entering the second chiller 26. The high-pressure subcooled refrigerant is allowed to expand as it passes through the second chiller expansion device 48 and leaves as a low-pressure liquid refrigerant and vapor refrigerant mixture. Suitable expansion devices may include, but are not limited to, thermal expansion valves, manual expansion valves, capillary tubes, automatic valves, electronic expansion valves, and float valves. In some embodiments, the second chiller expansion device 48 is an electronic expansion valve. In some embodiments, the second chiller expansion device 48 is a thermal expansion valve with a sensing bulb disposed downstream from the second chiller 26 for maintaining a desired superheat. In some embodiments, the second chiller expansion device 48 may function as a shutoff valve and is capable of being fully closed to prevent the flow of refrigerant through the second chiller 26. After passing through the second chiller expansion device 48, the refrigerant is directed to the second chiller 26.

The second chiller 26 is configured to exchange heat between the refrigerant in the second refrigerant loop 16 and the coolant of the coolant loop 12. As the refrigerant is heated, the low-pressure liquid refrigerant and vapor refrigerant mixture increases in substantially latent heat to become a low-pressure superheated vapor refrigerant. Typically, the second chiller 26 includes a refrigerant inlet and a refrigerant outlet as well as a coolant inlet and a coolant outlet. In some embodiments, the second chiller 26 comprises a plate heat exchanger having a plurality of stacked plates. The plates may be configured to form a plurality of alternating flow channels between the plurality of stacked plates such that the second portion of refrigerant and the coolant may flow through alternating channels and exchange heat through the plurality of stacked plates. The size of the first chiller (e.g., the number of stacked plates and the surface area of the plates) may be varied to achieve a desired amount of heat transfer between the second portion of refrigerant and the coolant. After exchanging heat with the coolant via the second chiller 26, the refrigerant is directed back to the second compressor 44.

Referring still to FIG. 2, the cooling system 10 includes a cooling system controller 50 for controlling various components of the cooling system 10. In the illustrated embodiment, the cooling system controller 50 is configured to operate the coolant pump 18, the valve 22, the first compressor 30, the evaporator shutoff valve 34, the chiller shutoff valve 40, and the second compressor 44.

The cooling system controller 50 is further configured to receive inputs from a coolant temperature sensor 52, a first discharge pressure sensor 54, an evaporator temperature sensor 56, a second discharge pressure sensor 58, a suction temperature sensor 60, and a suction pressure sensor 62. The coolant temperature sensor 52 is coupled to the coolant loop 12 and configured to provide a temperature of the coolant. In the illustrated embodiment, the coolant temperature sensor 52 is disposed between the coolant pump 18 and the battery 20 to provide a temperature reading of the coolant prior to the battery 20. The first head pressure sensor 54 is disposed proximate to the discharge port of the first compressor 30 and is configured to provide a pressure reading of the refrigerant leaving the first compressor 30. Typically, the evaporator temperature sensor 56 is a thermistor coupled to an exterior surface of the evaporator 38 to provide a temperature reading of the evaporator 38. The second head pressure sensor 58 is disposed proximate to the discharge port of the second compressor 44 and is configured to provide a pressure reading of the refrigerant leaving the second compressor 44. The suction temperature sensor 60 is disposed between the second chiller 26 and the suction port of the second compressor 44 and is configured to provide a temperature reading of the refrigerant leaving the second chiller 26. The suction pressure sensor 62 is disposed between the second chiller 26 and the suction port of the second compressor 44 and is configured to provide a pressure reading of the refrigerant leaving the second chiller 26. In some embodiments, the suction temperature sensor 60 and the suction pressure sensor 62 are a single transducer configured to provide both a pressure and a temperature reading of the refrigerant exiting the second chiller 26.

In various embodiments, the cooling system controller 50 is configured to receive readings from various HVAC sensors and user inputs from the HVAC controller 118 (FIG. 1). In some embodiments, the HVAC controller 118 and the cooling system controller 50 are operably coupled to an electronic control unit (ECU) of the vehicle 100 and configured to exchange data via the ECU. In some embodiments, the ECU may comprise multiple control units and may include the HVAC controller 118 and/or the cooling system controller 50. Accordingly, in some embodiments, the cooling system controller 50 is configured to receive additional vehicle information from the ECU and/or HVAC controller 118 including, but not limited to, vehicle speed, ambient air temperature, battery state-of-charge (SOC) levels, cabin cooling requirements (e.g., cabin air temperature setting), blower speed, and AC request status.

In various embodiments, the cooling system controller 50 is configured to determine the cooling needs of the battery 20. Typically, the cooling needs of the battery 20 are determined by the cooling system controller 50 upon receiving a coolant temperature reading from the coolant temperature sensor 52. The cooling system controller 50 may then determine if more battery cooling is desired or if less battery cooling is desired based on the received coolant temperature reading from the coolant temperature sensor 52.

In some embodiments, the cooling system controller 50 is configured to determine the cooling needs of the cabin 120. Typically, the cooling needs of the cabin 120 are determined by the cooling system controller 50 upon receiving, from the HVAC controller 118 (FIG. 1), signals related to various HVAC settings (e.g., the cabin air temperature setting, the blower speed, and the AC request status) as well as one or more signals relating to reading from the various HVAC sensors (e.g., cabin air temperature sensor, air discharge temperature sensor, sun load sensor, and ambient air temperature sensor). The cooling system controller 50 may then determine if more cabin cooling is desired or if less cabin cooling is desired based on the signals received from the HVAC controller 118.

Figure 3:
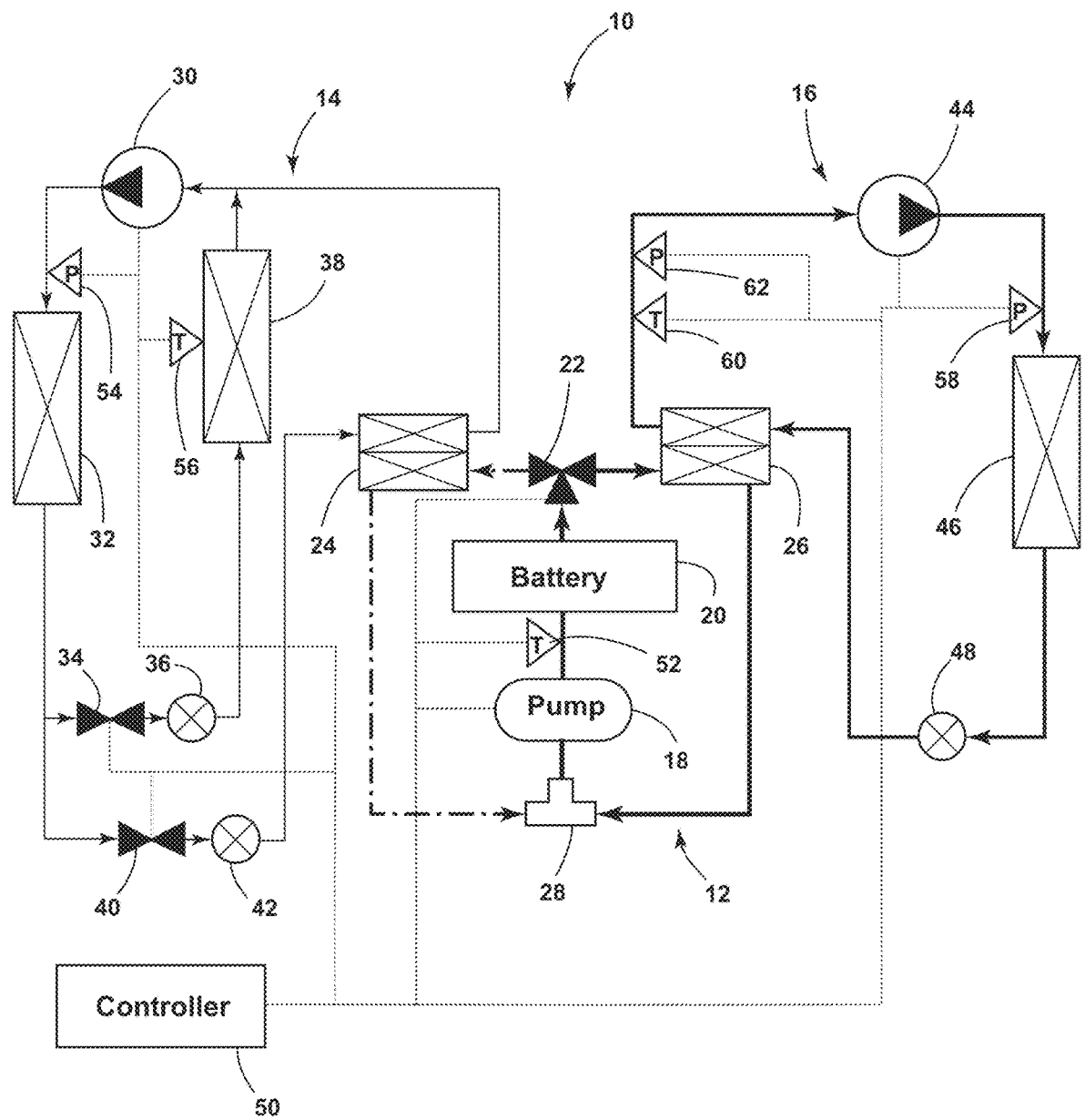
FIG. 3 is a schematic view of the cooling system of FIG. 2 operating in a second chiller only mode.

Referring now to FIG. 3, the cooling system 10 may be configured to operate in a second chiller only mode in situations where cooling of the battery 20 is needed, but no cooling demands on the cabin 120 (FIG. 1) are desired. If cooling of the battery 20 is needed, but no cooling of the cabin 120 is desired, the cooling system controller 50 may adjust the valve 22 to direct coolant to flow through the second chiller 26 while preventing coolant from flowing through the first chiller 24. Additionally, the cooling system controller 50 may adjust the speed of the second compressor 44 to circulate refrigerant through the second refrigerant loop 16. Accordingly, the coolant of the coolant loop 12 exchanges heat with the refrigerant of the second refrigerant loop 16 to cool the battery 20 while the first chiller 24 and the first refrigerant loop 14 remain substantially inactive. In some embodiments, the second chiller 26 may be sized to provide greater battery cooling as compared to the first chiller 24. Accordingly, in some embodiments, it may be desirable to give preference to the second chiller 26 for providing cooling to the battery 20.

Figure 4:
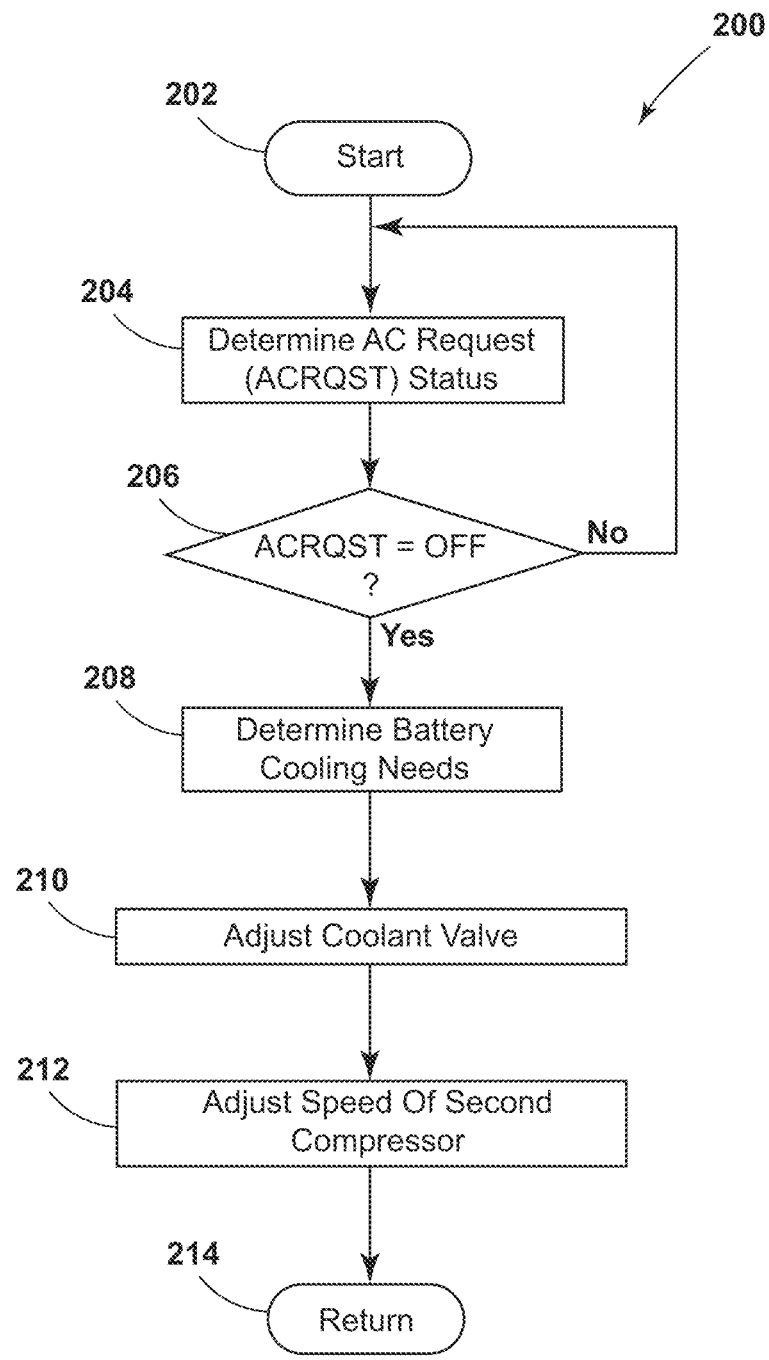
FIG. 4 is a flow diagram illustrating a method of operating the cooling system of FIG. 2 in the second chiller only mode.

Referring now to FIGS. 3 and 4, a method 200 is provided for operating the cooling system 10 in the second chiller only mode. The method 200 is initialized (operation 202) by the cooling system controller 50. The cooling system controller 50 then determines an AC request status (operation 204). The AC request status may be determined by a user input (e.g., an AC on/off button) or it may be determined by a controller of the vehicle 100 (e.g., as determined by the HVAC controller 118 while operating in an automatic temperature control setting). If the AC request is on (operation 206), then the cooling system controller 50 continues to monitor the AC request status. If the AC request status is off (operation 206), then the cooling system controller 50 determines the battery cooling needs (operation 208). If more or less battery cooling is needed, then the cooling system controller 50 may adjust the coolant valve 22 (operation 210) to direct a desired amount of coolant through the second chiller 26. While operating in the second chiller only mode, the cooling system controller 50 operates the coolant valve 22 to prevent coolant from flowing through the first chiller 24. The cooling system controller 50 may also adjust the speed of the second compressor 44 (operation 212) to satisfy the cooling needs of the battery 20. If more battery cooling is needed, the cooling system controller 50 may increase the speed of the second compressor 44 and if less battery cooling is needed, then the cooling system controller 50 may decrease the speed of the second compressor 44. The cooling system controller 50 may reiterate the method 200 (operation 214) to continue to monitor the cooling needs of the battery 20 and adjust the speed of the second compressor 44 to satisfy the cooling needs of the battery 20.

Figure 5:
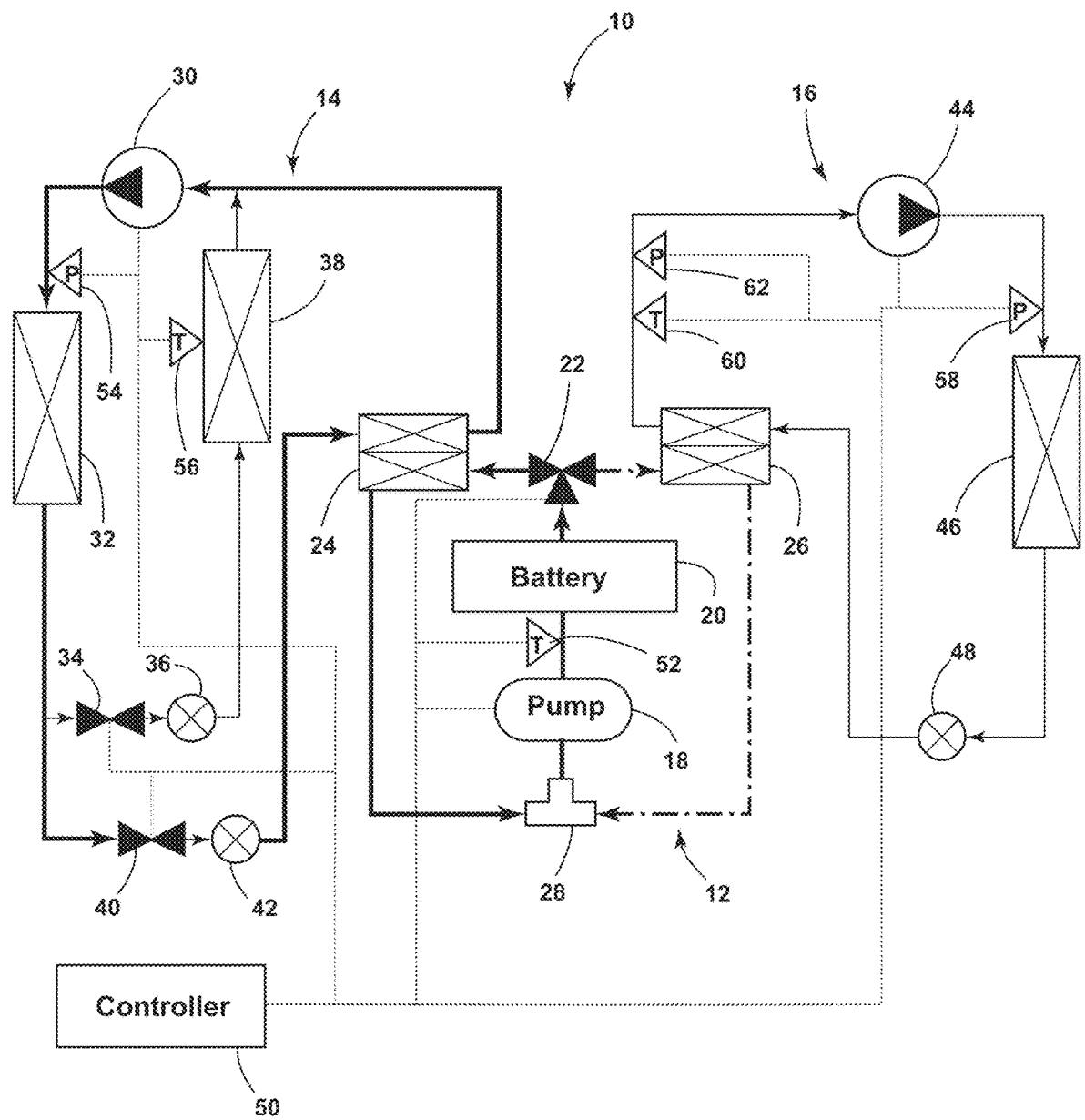
FIG. 5 is a schematic view of the cooling system of FIG. 2 operating in a first chiller only mode.

Referring now to FIG. 5, the cooling system 10 may be configured to operate in a first chiller only mode for battery cooling. In some embodiments, one of the first chiller 24 and the second chiller 26 is sized to provide greater heat dissipation than the other of the first chiller 24 and the second chiller 26. Accordingly, one of the first chiller 24 and the second chiller 26 may be preferred for exchanging heat with the coolant loop 12 over the other. However, each of the first chiller 24 and the second chiller 26 may be configured to exchange heat with the coolant loop 12 independently of the other. As illustrated, if cooling of the battery 20 is needed, but no cooling of the cabin 120 is desired, the cooling system controller 50 may adjust the valve 22 to direct coolant to flow through the first chiller 24 while preventing coolant from flowing through the second chiller 26. The cooling system controller 50 may also adjust the speed of the first compressor 30 to circulate refrigerant through the first refrigerant loop 14 and close the evaporator shutoff valve 34 to prevent refrigerant from flowing through the evaporator 38. Accordingly, the coolant of the coolant loop 12 exchanges heat with the refrigerant of the first refrigerant loop 14 to cool the battery 20 while the second chiller 26, the second refrigerant loop 16, and the evaporator 38 remain substantially inactive. Typically, the method for operating the cooling system 10 in the first chiller 24 only mode is substantially similar to method 200 for operating the cooling system 10 in the second chiller only mode except that the adjustments to the coolant valve 22 (operation 210) would be for directing a desired amount of coolant to the first chiller 24 and to prevent coolant from flowing to the second chiller 26 and the adjustments to the second compressor 44 (operation 212) would be applied to the first compressor 30.

Figure 6:
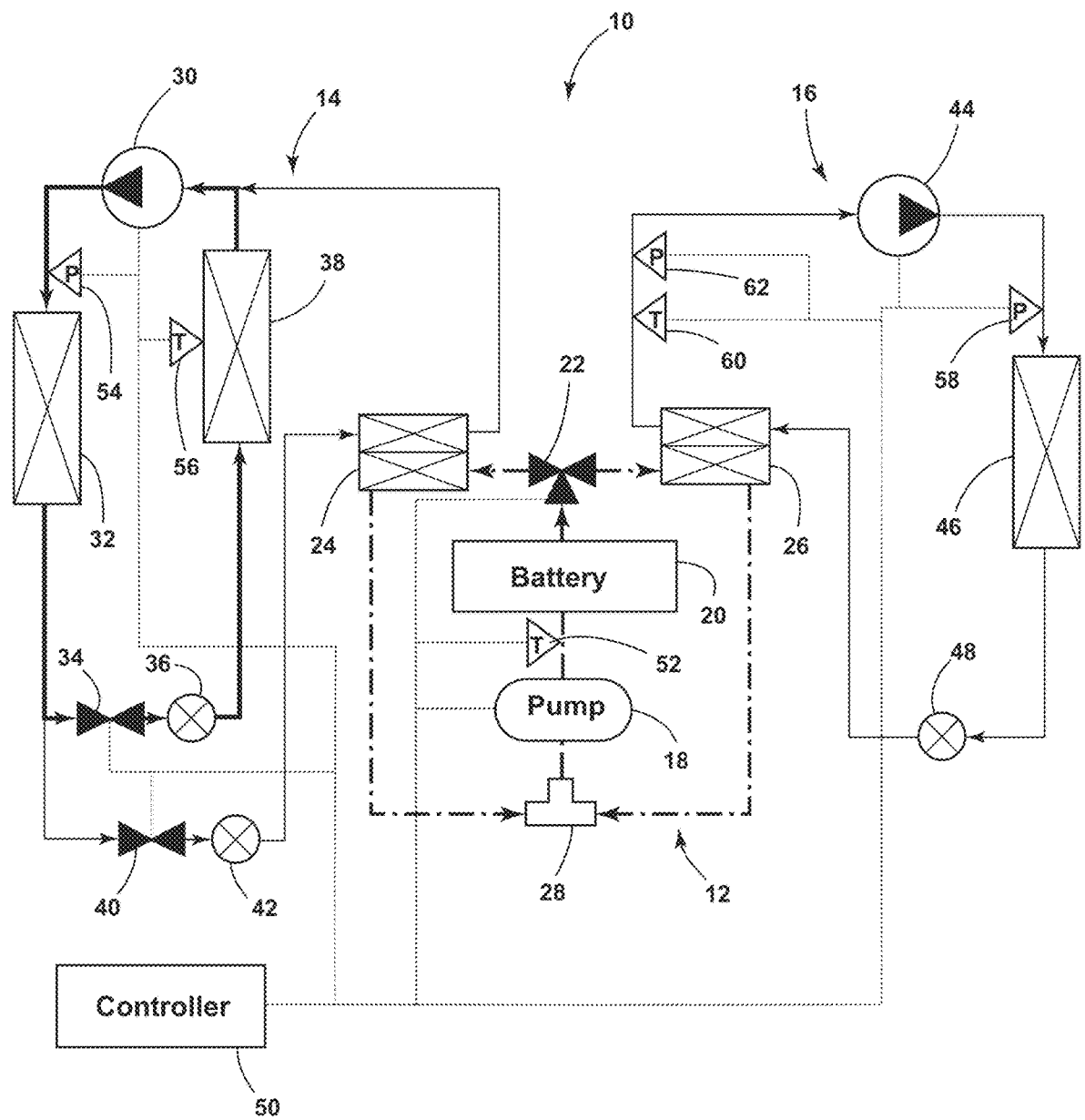
FIG. 6 is a schematic view of the cooling system of FIG. 2 operating in an air conditioning (AC) only mode.

Referring now to FIG. 6, the cooling system 10 may operate in an AC only mode where cooling of the cabin is desired and battery cooling is not needed. While operating in the AC only mode, the cooling system controller 50 adjusts the first chiller shutoff valve 40 to prevent the flow of refrigerant to the first chiller 24. Additionally, the cooling system controller 50 increases the speed of the first compressor 30 to provide the desired amount of cooling to the cabin 120. While operating in the AC only mode, the coolant pump 18 and the second compressor 44 are in an off state such that the coolant loop 12 and the second refrigerant loop 16 are substantially inactive.

Figure 7:
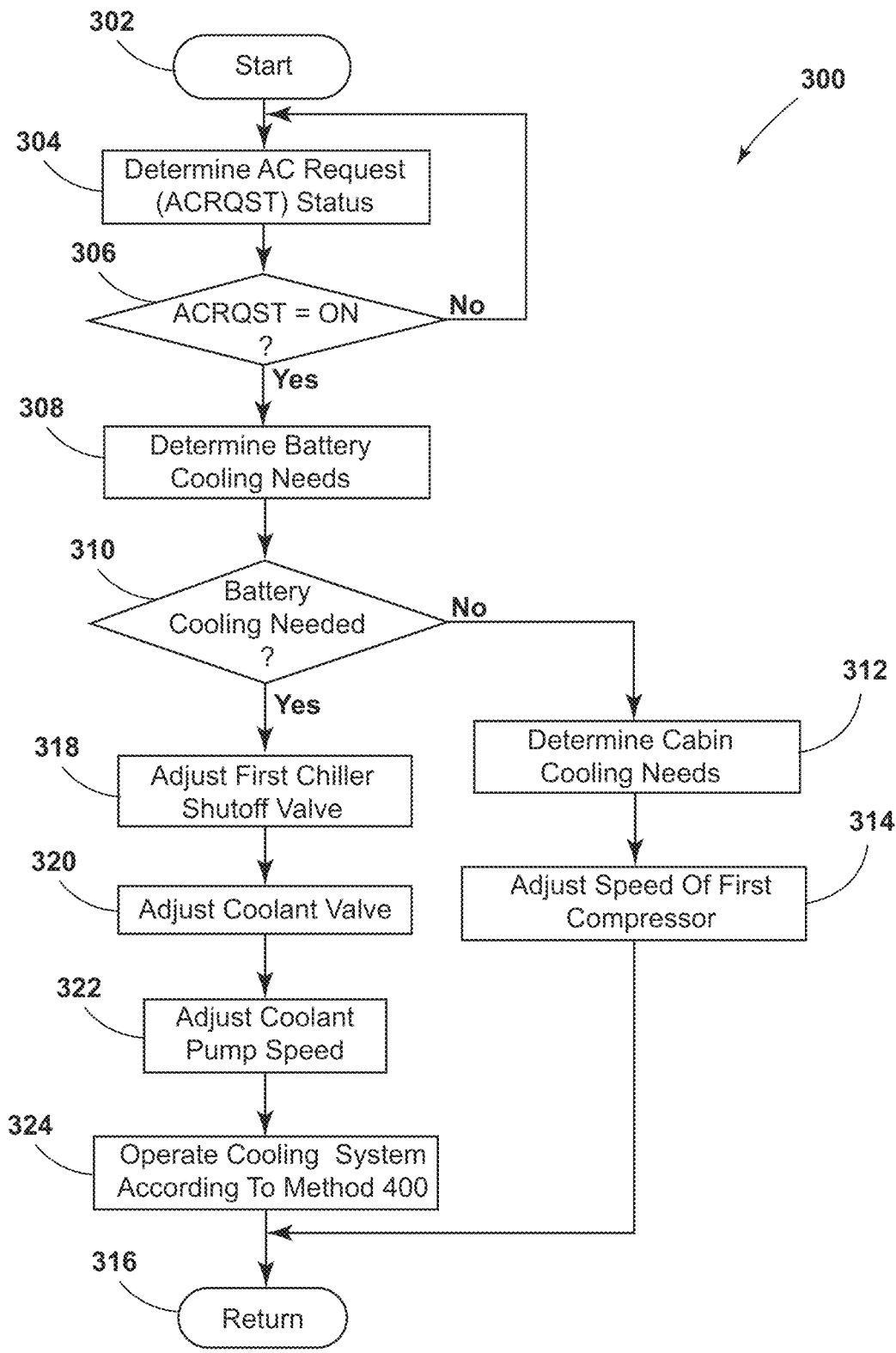
FIG. 7 is a flow diagram illustrating a method of operating the cooling system of FIG. 2 in the second chiller only mode.

Referring now to FIGS. 6 and 7, a method 300 is provided for operating the cooling system 10 in the AC only mode. The method 300 is initialized (operation 302) by the cooling system controller 50. The cooling system controller 50 then determines an AC request status (operation 304). The AC request status may be determined by a user input (e.g., an AC on/off button) or it may be determined by a controller of the vehicle 100 (e.g., as determined by the HVAC controller 118 while operating in an automatic temperature control setting). If the AC request is off (operation 306), then the cooling system controller 50 continues to monitor the AC request status. If the AC request status is on (operation 306), then the cooling system controller 50 determines the battery cooling needs (operation 308). If battery cooling is not needed (operation 310), then the cooling system controller 50 determines the cabin cooling needs (operation 312) and adjusts the speed of the first compressor 30 to meet the cabin cooling needs (operation 314). If more cabin cooling is needed, the cooling system controller 50 may increase the speed of the first compressor 30 and if less cabin cooling is needed then the cooling system controller 50 may decrease the speed of the first compressor 30. The cooling system controller 50 may reiterate the method 300 (operation 316) to continue to monitor the cooling needs of the cabin 120 and the battery 20 and adjust the speeds of the first compressor 30 and/or the second compressor 44 to satisfy the cooling needs of the cabin 120 and/or the battery 20.

If battery cooling is needed (operation 310), the cooling system controller 50 may adjust the first chiller shutoff valve 40 (operation 318) to allow refrigerant to flow through the first chiller 24. The cooling system controller 50 may further adjust the coolant valve 22 (operation 320) to direct coolant through the first chiller 24. The cooling system controller 50 may also adjust the coolant pump 18 (operation 322) to circulate coolant through the coolant loop 12. The cooling system 10 may then be operated according to method 400 (operation 324) as will be discussed in reference to FIGS. 8-11.

Figure 8:
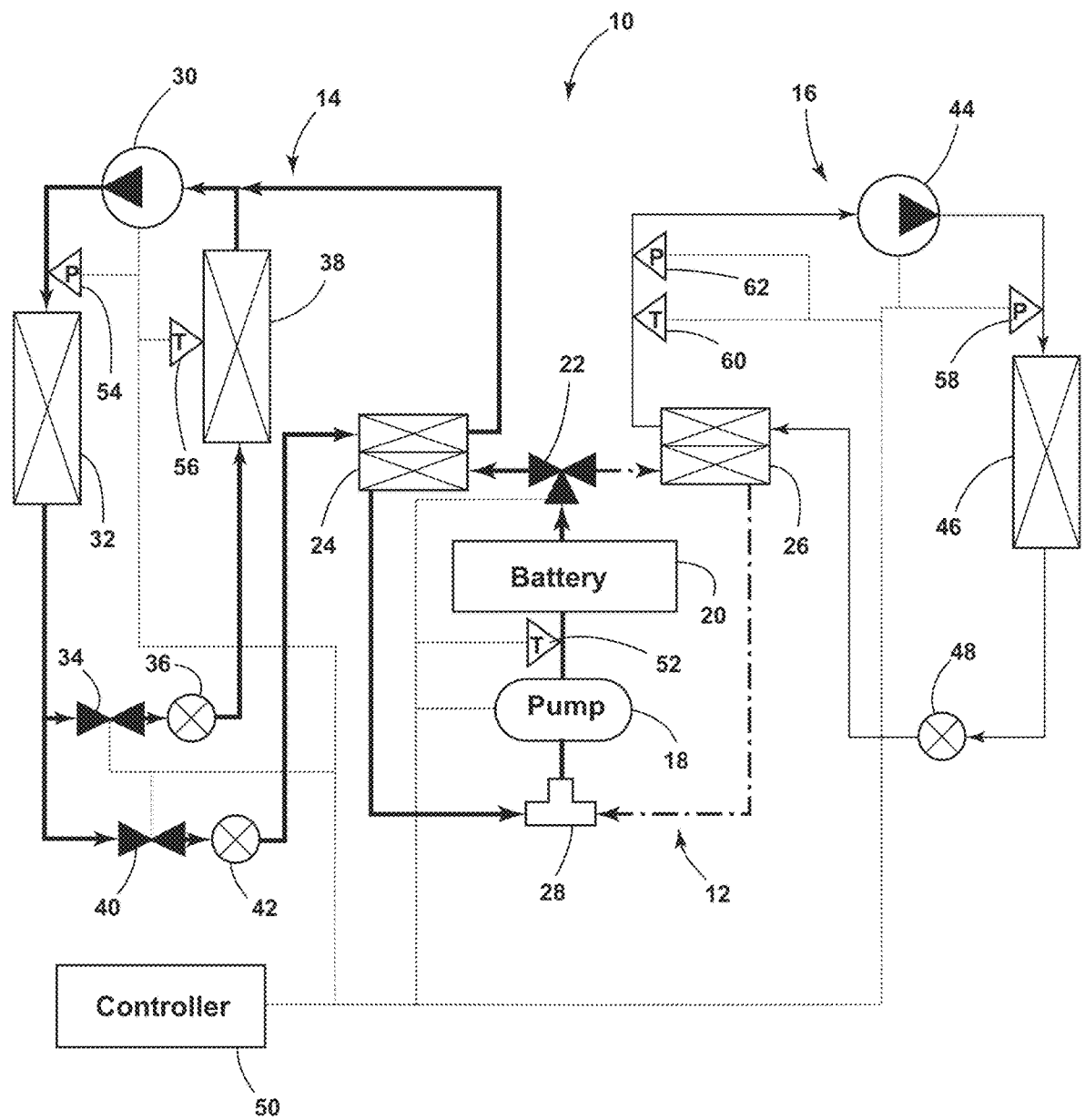
FIG. 8 is a schematic view of the cooling system of FIG. 2 operating in a first refrigerant loop only mode.
Figure 9:
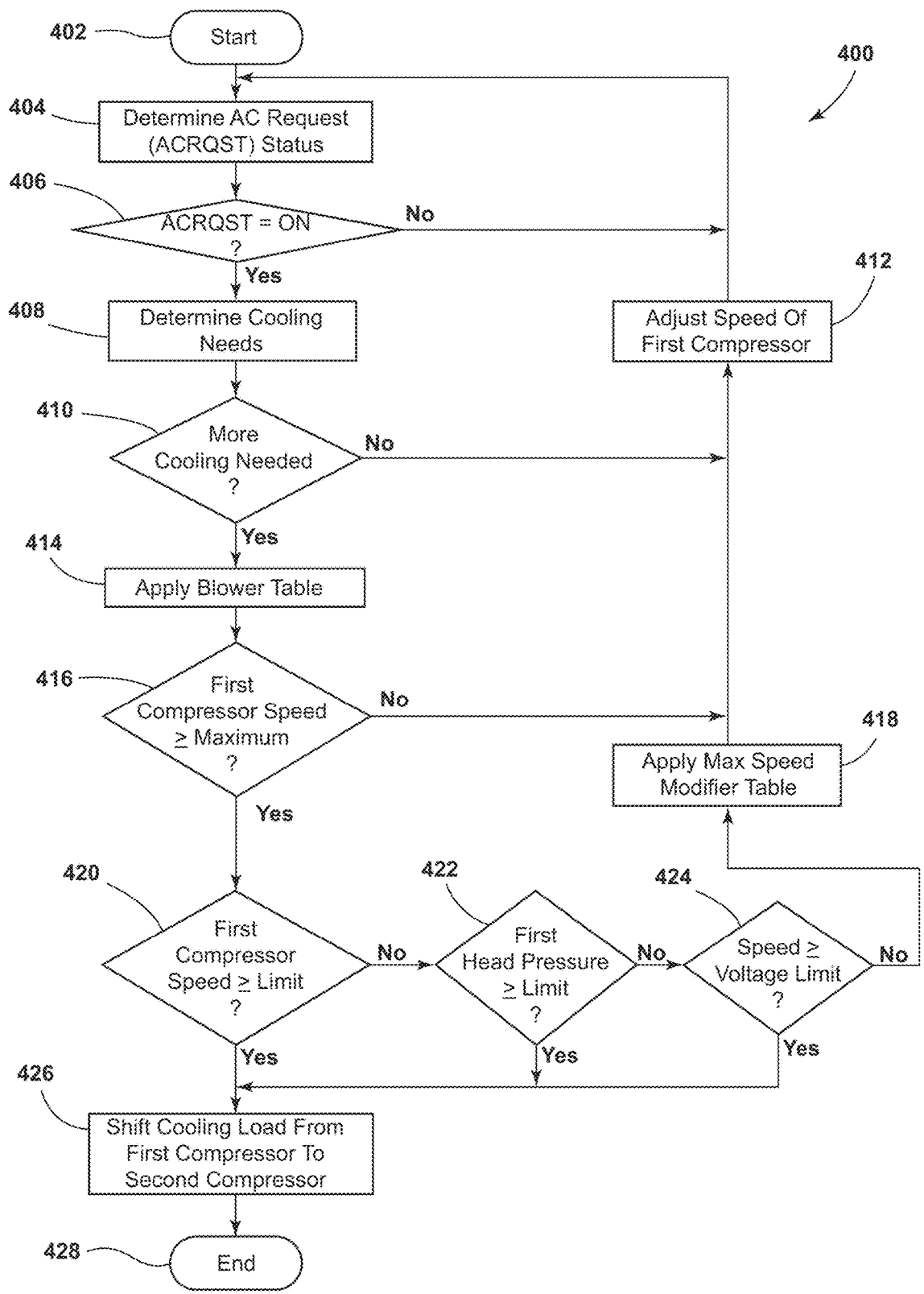
FIG. 9 is a flow diagram illustrating a method of operating the cooling system of FIG. 2 operating in the first refrigerant loop only mode.

Referring now to FIG. 8, the cooling system 10 may operate in the first refrigerant loop only mode where cooling of the cabin and of the battery 20 is desired. While operating in the first refrigerant loop only mode, the cooling system controller 50 adjusts the evaporator shutoff valve 34 and the first chiller shutoff valve 40 allows the flow of refrigerant to the evaporator 38 and to the first chiller 24. Additionally, the cooling system controller 50 may adjust the speed of the first compressor 30 to provide the desired amount of cooling to the cabin 120 and the battery 20. The coolant valve 22 is operated such that coolant is directed to flow through the first chiller 24 while the flow of coolant through the second chiller 26 is prevented. The speed of the coolant pump 18 may also be adjusted to circulate a desired amount of coolant through the first chiller 24. While operating in the first refrigerant loop only mode, the second compressor 44 is in an off state such that the second refrigerant loop 16 is substantially inactive.

Referring now to FIGS. 8-11, a method 400 is provided for operating the cooling system 10 in the AC only mode. The method 300 is initialized (operation 402) by the cooling system controller 50. The cooling system controller 50 then determines an AC request status (operation 404). The AC request status may be determined by a user input (e.g., an AC on/off button) or it may be determined by a controller of the vehicle 100 (e.g., as determined by the HVAC controller 118 while operating in an automatic temperature control setting). If the AC request is off (operation 406), then the cooling system controller 50 continues to monitor the AC request status. If the AC request status is on (operation 406), then the cooling system controller 50 determines the cooling needs of each of the battery 20 and the cabin 120 (operation 408). If cooling is not needed (operation 410), then the cooling system controller 50 adjusts the speed of the first compressor 30 to meet the cabin cooling needs (operation 412). If more cooling is needed, the cooling system controller 50 may increase the speed of the first compressor 30 and if less cabin cooling is needed, then the cooling system controller 50 may decrease the speed of the first compressor 30. The cooling system controller 50 may then continue to monitor the AC request status (operations 404 and 406) and the cooling needs (operations 408 and 410).

If the cooling system controller 50 determined that more cooling is needed (operation 410), the cooling system controller 50 applies a blower modifier table (operation 414) according to FIG. 10 to determine a maximum speed for the first compressor 30 based on blower speed and vehicle speed. Typically, the speed of the blower 106 is related to incremental steps (i.e., each step relates to a different speed of the blower 106). As shown in FIG. 10, the maximum speed of the first compressor 30 is based on a speed of the blower 106 as well as a speed of the vehicle 100. For example, if the blower 106 is operating at the third step and the vehicle 100 is traveling between 15 and 47 kilometers per hour (kph) then the cooling system controller 50 would use a maximum speed of 8600 revolutions per minute (RPM) for the first compressor 30. It will be understood by a skilled artisan that the table provided in FIG. 10 is exemplary only and that the actual values contained therein may vary without departing from the scope of the current disclosure. The cooling system controller 50 determines if the first compressor 30 is operating at or above the maximum speed (operation 416). If the first compressor 30 is operating below the maximum speed, then the cooling system controller 50 adjusts the speed of the first compressor 30 (operation 412) to satisfy the cooling demands of the cooling system 10.

In some embodiments, the first compressor 30 may have an absolute limit determined by at least one of a variety of limiting factors including, but not limited to, a predetermined limit, a head pressure limit, and a voltage limit. In some examples, the cooling system controller 50 determines if the speed of the first compressor 30 is at or exceeds a predetermined limit (operation 420). If the speed of the first compressor 30 is below the predetermined limit (e.g., 11,000 RPM), then the cooling system controller 50 may check for an additional limiting factor that would prevent the cooling system controller 50 from increasing the speed of the first compressor 30.

In some embodiments, the cooling system controller 50 receives a first head pressure reading provided by the first head pressure sensor 54 and determines if the first head pressure reading is at or exceeds a head pressure limit (operation 422). If the first head pressure reading is below the head pressure limit, the cooling system controller 50 may check for an additional limiting factor that would prevent the cooling system controller 50 from increasing the speed of the first compressor 30.

In some embodiments, the cooling system controller 50 may be configured to detect the physical limitations of the cooling system 10 as related to the first compressor 30. For example, in embodiments where the first compressor 30 is driven by an electric motor, the first compressor 30 may have a voltage limit as determined by the available voltage to be supplied to the first compressor 30. In some embodiments, the voltage limit may be predetermined to be less than the available voltage such that the first compressor 30 is limited by the cooling system controller 50. The cooling system controller 50 may detect if the first compressor 30 is operating at the voltage limit (operation 424). If the speed of the first compressor 30 is below the voltage limit, the cooling system controller 50 may check for an additional limiting factor that would prevent the cooling system controller 50 from increasing the speed of the first compressor 30.

If the cooling system controller 50 determines that the speed of the first compressor 30 is below the absolute limit, as determined by the variety of limiting factors, the cooling system controller 50 applies a maximum speed modifier table (operation 418) according to FIG. 11 up to the absolute limit. As illustrated in FIG. 11, a maximum speed modifier is determined by the cooling system controller 50 according to a coolant temperature reading from the coolant temperature sensor 52. As illustrated, the maximum speed modifier increases as the temperature of the coolant increases. For example, a coolant temperature of 53 degrees Celsius increases the maximum speed by 500 RPM while a coolant temperature of 59 degrees Celsius increases the maximum speed by 3500 RPM. The maximum speed modifier is combined with the maximum speed as determined by the blower modifier table provided in FIG. 10 to produce a modified maximum speed. In some embodiments, the modified maximum speed may be capped at the absolute limit (e.g., as determined by one of the predetermined limit, the head pressure limit, and the voltage limit). It will be understood by a skilled artisan that the table provided in FIG. 11 is exemplary only and that the actual values contained therein may vary without departing from the scope of the current disclosure. The cooling system controller 50 then adjusts the speed of the first compressor 30 (operation 412) to provide the desired cooling to the cabin 120 and/or battery 20.

If the cooling system controller 50 determined that the speed of the first compressor 30 is at or exceeds the absolute limit, the cooling system controller 50 shifts a portion of the cooling load from the first compressor 30 to the second compressor 44 (operation 426). In various embodiments, the cooling system controller 50 shifts a portion of the cooling load from the first compressor 30 to the second compressor 44 by adjusting the cooling valve 22 to direct coolant to both the first chiller 24 and the second chiller 26. The cooling system controller 50 further adjusts the speed of the second compressor 44 to circulate refrigerant through the second refrigerant loop 16. The cooling system controller 50 may then adjust the speeds of the first compressor 30 and the second compressor 44 according to method 500, as will be discussed in reference to FIGS. 12 and 13, to satisfy the cooling needs of the cabin 120 and the battery 20 and method 400 will conclude (operation 428).

Figure 12:
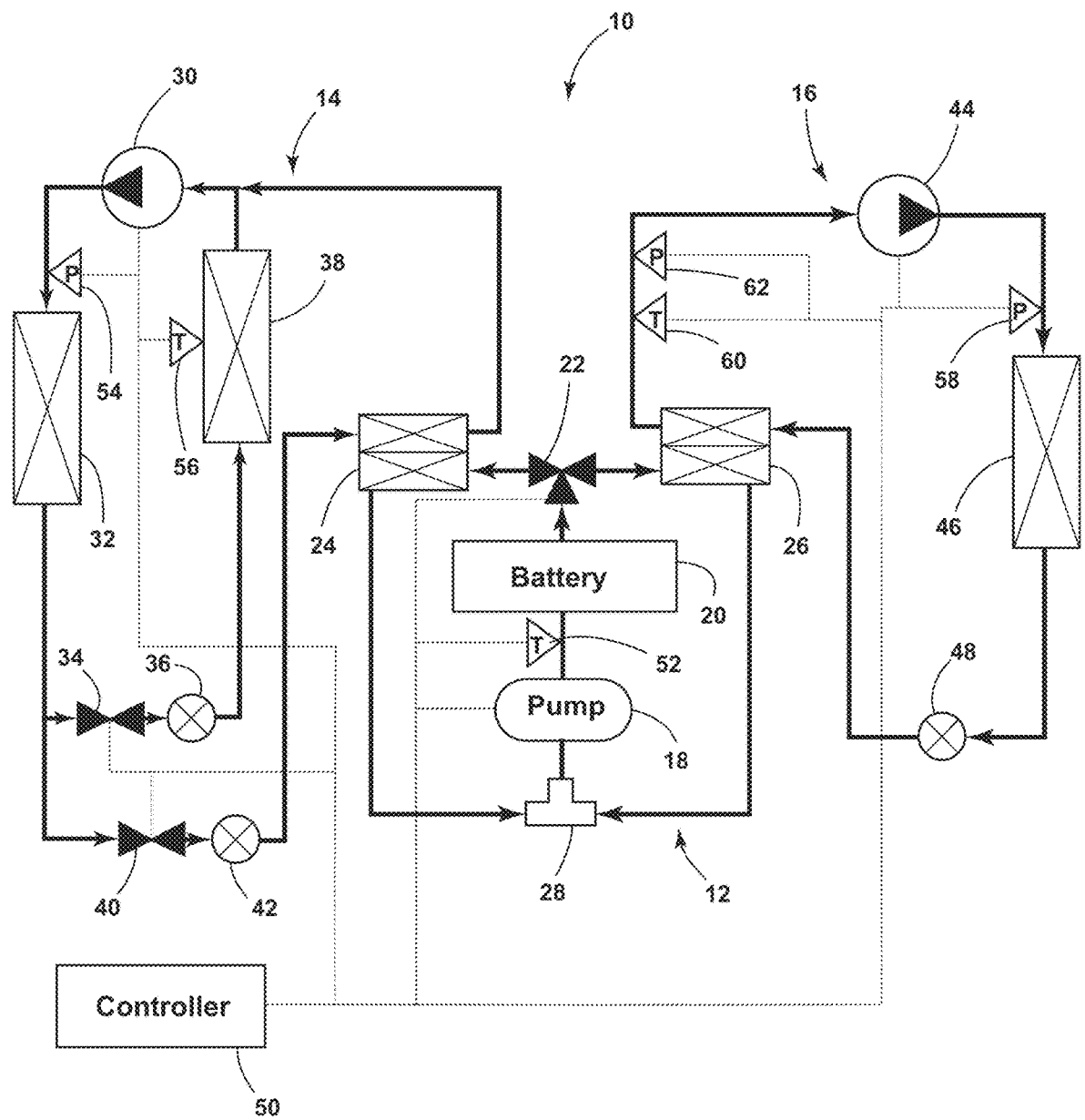
FIG. 12 is a schematic view of the cooling system of FIG. 2 operating in a dual refrigerant loop mode.
Figure 13:
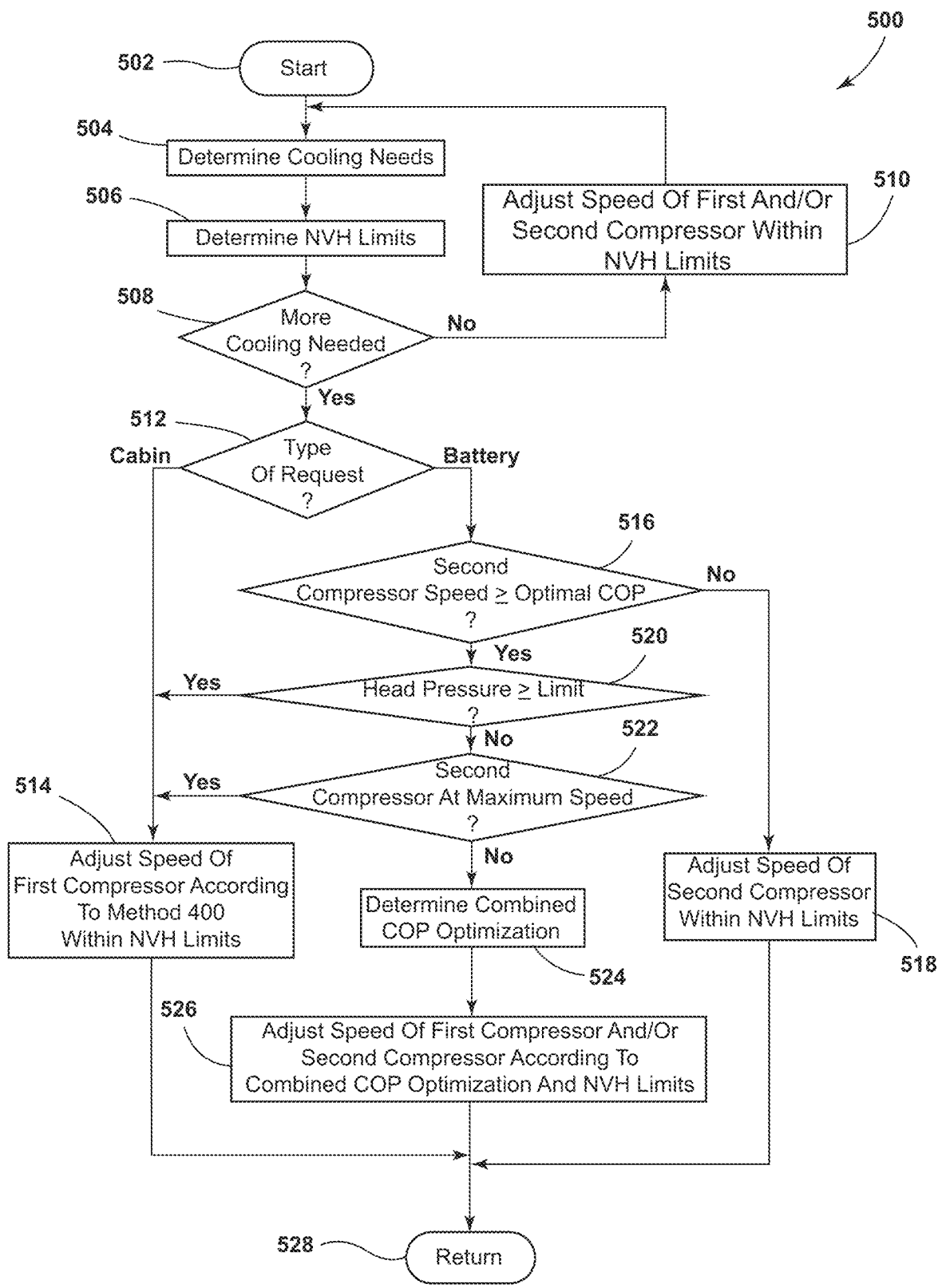
FIG. 13 is a flow diagram illustrating a method of operating the cooling system of FIG. 2 operating in the dual refrigerant loop mode.

Referring now to FIG. 12, the cooling system 10 may operate in a dual refrigerant loop mode where cooling of the cabin 120 and of the battery 20 is desired. Typically, the cooling system 10 operates in the dual refrigerant loop mode when the combined cooling demands of the cabin 120 and the battery 20 exceed the cooling capabilities of the first refrigerant loop 14 or the second refrigerant loop 16. In various embodiments, the controller 50 is configured to determine the cooling capabilities of each of the first refrigerant loop 14 and the second refrigerant loop 16 based on the size of the various components (e.g., the first compressor 30, the second compressor 44, the evaporator 38, the first condenser 32, the second condenser 46, the first chiller 24, and the second chiller 26) and the flow rates of the refrigerant in the first refrigerant loop 14, the refrigerant in the second refrigerant loop 16, and the coolant in the coolant loop 12. While operating in the dual refrigerant loop mode, the cooling system controller 50 adjusts the evaporator shutoff valve 34 and the first chiller shutoff valve 40 allows the flow of refrigerant to the evaporator 38 and to the first chiller 24. The cooling system controller 50 may close the evaporator shutoff valve 34 in circumstances where cooling of the cabin 120 is not desired and the cooling demands of the battery 20 exceed the capabilities of the cooling system 10 while operating in the first refrigerant loop only mode or the second refrigerant loop only mode. While operating in the dual refrigerant loop mode, the cooling system controller 50 may adjust the speed of the first compressor 30 and/or the second compressor 44 to provide the desired amount of cooling to the cabin 120 and the battery 20. The coolant valve 22 is operated such that coolant is directed to flow through both the first chiller 24 and the second chiller 26. In some embodiments, the coolant valve 22 is configured to provide a variable flow rate through each of the first chiller 24 and the second chiller 26 independently. The speed of the coolant pump 18 may also be adjusted to circulate a desired amount of coolant through each of the first chiller 24 and the second chiller 26.

Referring now to FIGS. 12-15, a method 500 is provided for operating the cooling system 10 in the dual refrigerant loop mode. The method 500 is initialized (operation 502) by the cooling system controller 50. The cooling system controller 50 then determines the cooling needs of each of the battery 20 and the cabin 120 (operation 504).

While operating in the dual refrigerant loop mode, the cooling system controller 50 may determine noise, vibration, and harshness (NVH) limits (operation 506) for the first compressor and the second compressor. For example, while operating in the dual refrigerant loop mode, the first compressor 30 and the second compressor 44 are typically operating simultaneously. Accordingly, it may be desirable to avoid harmonic vibrations between the first compressor 30 and the second compressor 44. The vibrations may include, but are not limited to, audible frequencies detectable by the human ear as well as vibrations that may be felt by the user (e.g., vibrations from the first compressor 30 and/or the second compressor 44 traveling through the frame of the vehicle 100). Typically, a harmonic frequency results when a first frequency interacts with a second frequency that is an integer multiple of the first frequency. The resulting harmonic frequency may cause audible noise or vibration felt by the user that is undesirable. Accordingly, NVH limits may be determined by the cooling system controller 50 (operation 506) to prevent harmonic frequencies from being produced by the first compressor 30 and the second compressor 44. For example, in some embodiments, the cooling system controller 50 may prevent one of the first compressor 30 and the second compressor 44 from operating at a frequency within a given range of integer multiples of a frequency of the other of the first compressor 30 and the second compressor 44.

The cooling system 10 based on the determined cooling needs of the cooling system 10 (operation 504) may determine if more cooling is needed or if less cooling is needed. If more cooling is not needed (operation 506), then the cooling system controller 50 may adjust the speed of the first compressor 30 and/or the second compressor 44 within the NVH limits to meet the cooling needs of the cabin 120 and the battery 20 (operation 510).

If more cooling is needed, the cooling system controller 50 may then determine if the increased cooling need is from a cabin cooling request or from a battery cooling request (operation 512). If the request is for more cabin cooling, then the cooling system controller 50 adjusts the speed of the first compressor 30 according to method 400 (operation 514) to satisfy the increased cooling needs of the cabin 120. However, the cooling system controller 50 may do so according to the determined NVH limits (operation 506) while operating in the dual refrigerant loop mode. The cooling system controller 50 may reiterate the method 500 (operation 528) to continue to monitor the cooling needs of the cabin 120 and the battery 20 and adjust the speeds of the first compressor 30 and/or the second compressor 44 to satisfy the cooling needs of the cabin 120 and/or the battery 20.

Figure 14:
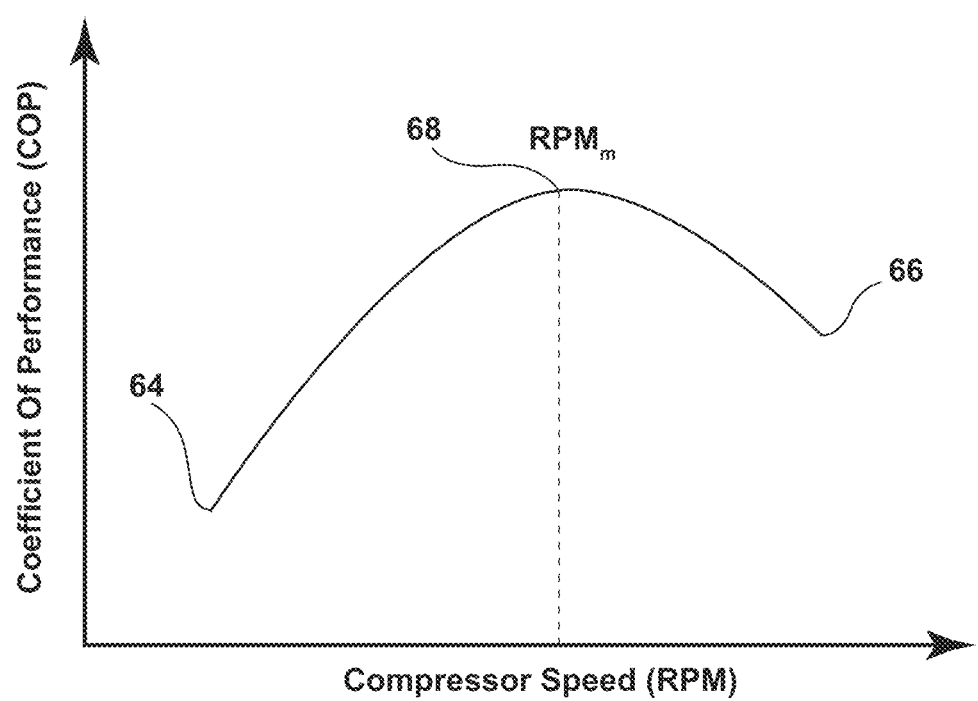
FIG. 14 is a graph illustrating an efficiency curve of a first compressor and a second compressor of the cooling system of FIG. 2.

If the increased cooling need is from a request for more battery cooling (operation 512), then the cooling system controller 50 determines if the second compressor 44 is operating below a speed relating to an optimal coefficient of performance (COP) of the second compressor 44 (operation 516). As shown in FIG. 14, an illustrative efficiency curve (FIG. 5) corresponding to the first compressor 30 and/or the second compressor 44 is provided. Typically, the first compressor 30 and/or the second compressor 44 are operable across a range of speeds. The efficiency of the first compressor 30 and/or the second compressor 44 varies in relation to the speed at which the first compressor 30 and/or the second compressor 44 is operating. Typically, the efficiency of the first compressor 30 and/or the second compressor 44 is lower at a lower limit 64 and upper limit 66 of the operable range of speeds of the first compressor 30 and/or the second compressor 44. The efficiency of the first compressor 30 and/or the second compressor 44 increases as the speed of the first compressor 30 and/or the second compressor 44 increases/decreases away from the lower limit 64 and/or the upper limit 66 until it reaches a speed of optimal COP 68 of the first compressor 30 and/or the second compressor 44.

Referring back to FIG. 13, if the second compressor 44 is operating at a speed less than the speed relating to the optimal COP 68 of the second compressor 44 (operation 516), then the cooling system controller 50 adjusts the speed of the second compressor 44 (operation 518) according to the determined NVH limits (operation 506) to satisfy the increased cooling needs of the battery 20.

If speed of the second compressor 44 is equal to or exceeds the speed relating to the optimal COP 68 of the second compressor 44 (operation 516), then the cooling system controller 50 determines if a head pressure reading from the second head pressure sensor 58 (FIG. 12) exceeds a head pressure limit for the second refrigerant loop 16. If the head pressure reading exceeds the head pressure limit (operation 520), then the cooling system controller 50 adjusts the speed of the first compressor 30 (operation 514) according to the determined NVH limits (operation 506) to satisfy the increased cooling needs of the battery 20. The cooling system controller 50 may reiterate the method 500 (operation 528) to continue to monitor the cooling needs of the cabin 120 and the battery 20 and adjust the speeds of the first compressor 30 and/or the second compressor 44 to satisfy the cooling needs of the cabin 120 and/or the battery 20.

If the received head pressure reading from the second head pressure sensor 58 (FIG. 12) is less than the head pressure limit (operation 520), then the cooling system controller 50 determines if the speed of the second compressor 44 is equal to or exceeds a maximum speed of the second compressor 44 (operation 522). If the speed of the second compressor 44 is equal to or exceeds the maximum speed of the second compressor 44, then the cooling system controller 50 adjusts the speed of the first compressor 30 (operation 514) according to the determined NVH limits (operation 506) to satisfy the increased cooling needs of the battery 20. The cooling system controller 50 may then reiterate the method 500 (operation 528) to continue to monitor the cooling needs of the cabin 120 and the battery 20 and adjust the speeds of the first compressor 30 and/or the second compressor 44 to satisfy the cooling needs of the cabin 120 and/or the battery 20.

If the speed of the second compressor 44 is below the maximum speed of the second compressor 44 (operation 522), then the cooling system controller 50 determines a combined COP optimization of the first compressor 30 and the second compressor 44 (operation 524). In some embodiments, the combined COP may be determined by determining an overall energy input for the cooling system 10 and dividing it by the overall energy output of the cooling system 10. The combined COP may then be optimized (operation 524) by determining a speed of the first compressor 30 and a speed of the second compressor 44 that provides the greatest combined COP for satisfying the cooling needs of the cabin 120 and/or the battery 20. After determining the combined COP optimization (operation 524), the cooling system controller 50 adjusts the speed of the first compressor 30 and/or the second compressor 44 (operation 526) according to the determined combined COP optimization (operation 524) and according to the determined NVH limits (operation 506). The cooling system controller 50 may reiterate the method 500 (operation 528) to continue to monitor the cooling needs of the cabin 120 and the battery 20 and adjust the speeds of the first compressor 30 and/or the second compressor 44 to satisfy the cooling needs of the cabin 120 and/or the battery 20.

Figure 15:
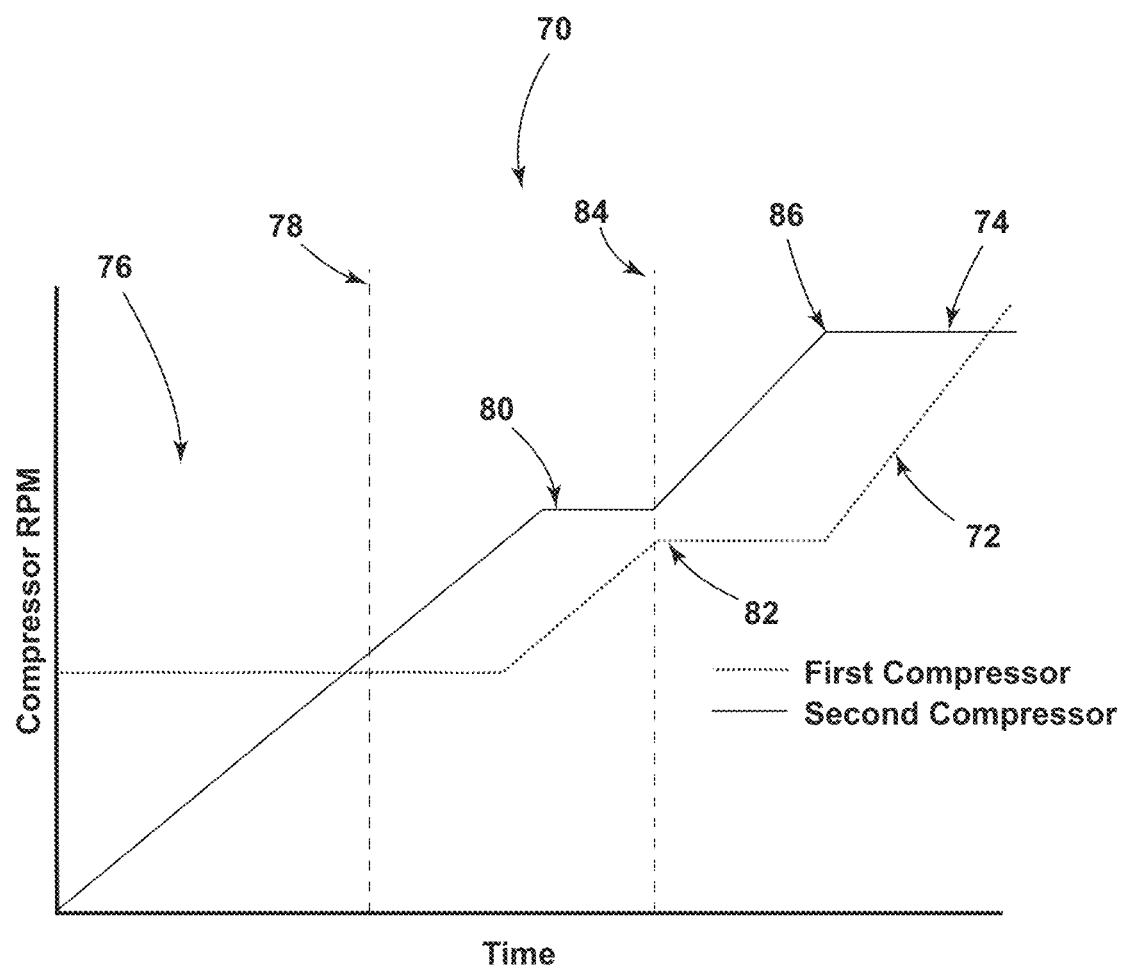
FIG. 15 is a graph illustrating a first use case of the cooling system of FIG. 2 while operating in a dual refrigerant loop mode.

Referring now to FIG. 15, a graph depicting a first use case 70 for operating the first compressor 30 and the second compressor 44 according to method 500 (FIG. 13) while the cooling system 10 is operating in the dual refrigerant loop mode is provided. As illustrated, the first use case 70 depicts a first compressor speed 72 and a second compressor speed 74 over a given period of time. The illustrated first use case 70 is provided as an example of conditions where the cooling demands for the cabin 120 remain constant while cooling needs for the battery 20 are increasing. Some examples of when such a situation would arise includes, but is not limited to, when the vehicle 100 begins an ascent up an incline thus requiring more power from the battery 20 without a substantial change in the cooling needs of the cabin 120, or when a load (e.g., trailer) is attached to the vehicle 100 thus increasing the power needed from the battery 20 without substantially changing the cooling conditions of the cabin 120.

During a first portion 76 of the first use case 70, the cooling system controller 50 maintains the first compressor speed 72 to maintain the current cabin cooling needs (see operations 512, 514), while increasing the second compressor speed 74 to satisfy the increasing battery cooling needs (see operations 512, 516, and 518). A first NVH limit 78 may be established as the second compressor speed 74 nears/exceeds the first compressor speed 72 to prevent the generation of harmonic frequencies (see operations 506, and 518). At a second portion 80 of the use case, the cooling system controller 50 is operating the second compressor speed 74 at the speed of optimal COP 68. Accordingly, the cooling system controller 50 holds the second compressor speed 74 constant while increasing the first compressor speed 72 to satisfy the increasing battery cooling needs according to the combined COP optimization (see operations 512, 516, 520, 522, 524 and 526). At a third portion 82 of the first use case 70, the first compressor speed 72 has neared the speed of optimal COP 68, however, a second NVH limit 84 may be enforced and the cooling system controller 50 may hold the first compressor speed 72 at a reduced speed to prevent the generation of harmonic frequencies between the first compressor 30 and the second compressor 44 (see operation 506). The cooling system controller 50 then increases the second compressor speed 74 to continue to satisfy the increasing battery cooling demands. At a fourth portion 86 of the first use case 70, the second compressor speed 74 reaches a maximum speed and/or the head pressure reading from the second head pressure sensor 58 (FIG. 2) may reach or exceed the head pressure limit of the second refrigerant loop 16 (see operations 516 and 520 or 522). Accordingly, the cooling system controller 50 increases the first compressor speed 72 to satisfy the increasing battery cooling needs (see operations 512, 516, 520 or 522, and 514).

It will be understood by a skilled artisan that the first use case 70 is provided by way of example and that the actual operation of the cooling system 10 while operating in the dual refrigerant loop mode may vary. More specifically, in some embodiments, the cooling system controller 50 may adjust the first compressor speed 72 and the second compressor speed 74 simultaneously to optimize the combined COP of the first compressor 30 and the second compressor 44.

Figure 16:
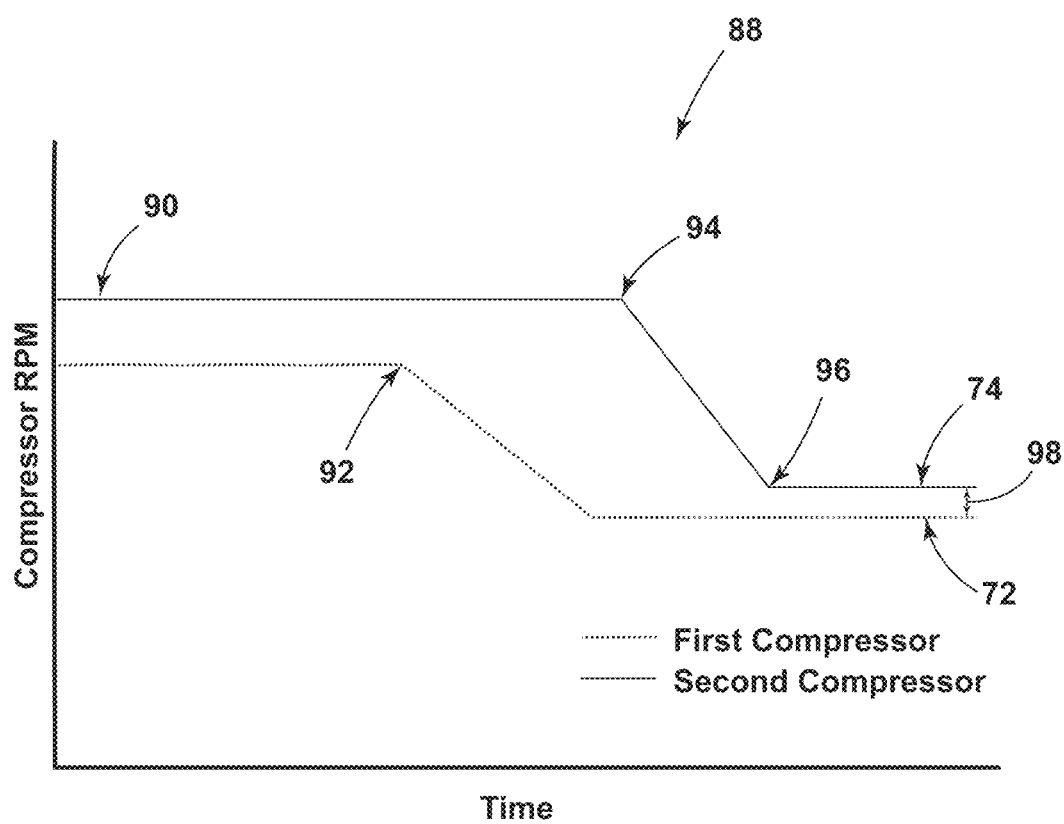
FIG. 16 is a graph illustrating a second use case of the cooling system of FIG. 2 while operating in a dual refrigerant loop mode.

Referring now to FIG. 16, a graph depicting a second use case 88 for operating the first compressor 30 and the second compressor 44 according to method 500 (FIG. 13) while the cooling system 10 is operating in the dual refrigerant loop mode is provided. As illustrated, the second use case 88 depicts the first compressor speed 72 and the second compressor speed 74 over a given period of time. The illustrated second use case 88 is provided as an example of conditions where operation of the vehicle 100 begins while the temperatures of cabin 120 and the battery 20 are higher than desired. A typical example of when such a situation would arise includes situations where the vehicle 100 has been parked in a hot environment (e.g., outside on a hot day) while the battery 20 is charging. Accordingly, the cabin 120 may be hotter than desired due to the hot environment and the battery temperature is increased resulting from at least one of the hot environment and the charging of the battery 20.

During a first portion 90 of the second use case 88, the cooling system controller 50 maintains the second compressor speed 74 at a maximum speed and the first compressor speed 72 at a speed sufficient to satisfy the cooling demands of the cabin 120 and the battery 20. As the temperatures of the cabin 120 and/or the battery 20 decrease, the cooling needs to keep the cabin 120 and/or the battery 20 within an acceptable temperature range also decreases. Accordingly, during a second portion 92 of the second use case 88, as the cooling needs of the cabin 120 and the battery 20 decrease, the cooling system controller 50 decreases the first compressor speed 72 to satisfy the cooling needs of the cabin 120 and the battery 20 (see operations 508 and 510). At a third portion 94 of the second use case 88, the first compressor speed 72 reaches a speed of optimal COP 68 and the cooling system controller 50 begins decreasing the second compressor speed 74 to satisfy the cooling needs of the cabin 120 and the battery 20 (see operations 508 and 510). At a fourth portion 96 of the second use case 88, the cooling system 10 may reach a substantially steady state and the cooling system controller 50 may hold first compressor speed 72 and the second compressor speed 74 at a steady speed. In some embodiments, the first compressor speed 72 and the second compressor speed 74 an NVH limit 98 of the second use case 88 may be determined by the cooling system controller 50 (see operation 506) and cooling system controller 50 maintains a difference between the first compressor speed 72 and the second compressor speed 74 to prevent the generation of harmonic frequencies.

It will be understood by a skilled artisan that the second use case 88 is provided by way of example and that the actual operation of the cooling system 10 while operating in the dual refrigerant loop mode may vary. More specifically, in some embodiments, the cooling system controller 50 may adjust the first compressor speed 72 and the second compressor speed 74 simultaneously to optimize the combined COP of the first compressor 30 and the second compressor 44.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A method of operating a cooling system for a vehicle comprising:

provides the cooling system comprising:
  a coolant loop configured to exchange heat with a battery;
  a first refrigerant loop comprising a first compressor, an evaporator configured to exchange heat with a cabin of said vehicle, an evaporator shutoff valve, a first chiller configured to exchange heat with the coolant loop, and a first chiller shutoff valve; and
  a second refrigerant loop comprising a second compressor and a second chiller configured to exchange heat with the coolant loop, wherein the coolant loop comprises a coolant valve for selectively directing or preventing the flow of a coolant between the battery and each of the first chiller and the second chiller;
providing a cooling system controller operably coupled to the first compressor, the second compressor, the coolant valve, the evaporator shutoff valve, and the first chiller shutoff valve;
determining cooling capabilities of each of the first refrigerant loop and the second refrigerant loop;
determining cabin cooling needs and battery cooling needs;
adjusting the coolant valve to selectively direct or prevent the flow of the coolant to at least one of the first chiller and the second chiller;
adjusting the coolant valve to direct the coolant to the first chiller and prevent the flow of the coolant to the second chiller when cabin cooling is needed and the combined cooling needs of the cabin and the battery are less than the cooling capability of the first refrigerant loop;
modifying a speed of at least one of the first compressor and the second compressor to satisfy the cabin cooling needs and the battery cooling needs; and
determining a combined coefficient of performance (COP) optimization for the first compressor and the second compressor and modifying the speed of the first compressor and the second compressor according to the combined COP optimization.

2. The method of claim 1, further comprising adjusting the coolant valve to direct coolant to the second chiller and prevent the flow of coolant to the first chiller when cabin cooling is not needed and the battery cooling needs are less than the cooling capability of the second refrigerant loop.

3. The method of claim 1, further comprising adjusting the coolant valve to prevent the flow of the coolant to the first chiller and the second chiller and adjusting the evaporator shutoff valve and the first chiller shutoff valve to direct the flow of refrigerant in the first refrigerant loop to the evaporator and prevent the flow of refrigerant to the first chiller when cabin cooling is needed and battery cooling is not needed.

4. The method of claim 1, further comprising adjusting the coolant valve to direct the coolant to the first chiller and the second chiller when the combined cooling needs of the cabin and the battery exceed the cooling capability of each of the first refrigerant loop and the second refrigerant loop.

5. The method of claim 1, further comprising determining noise, vibration, and harshness (NVH) limits for the first compressor and the second compressor and modifying the speed of the first compressor and the second compressor according to the NVH limits.

6. A method of operating a cooling system for a vehicle comprising:

providing the cooling system including a coolant loop configured to exchange heat with a battery; a first refrigerant loop comprising a first compressor, an evaporator configured to exchange heat with a cabin of said vehicle, an evaporator shutoff valve, a first chiller configured to exchange heat with the coolant loop, and a first chiller shutoff valve; and a second refrigerant loop comprising a second compressor and a second chiller configured to exchange heat with the coolant loop, wherein the coolant loop comprises a coolant valve for selectively directing or preventing the flow of a coolant between the battery and each of the first chiller and the second chiller;

providing a cooling system controller operably coupled to the first compressor, the second compressor, the coolant valve, the evaporator shutoff valve, and the first chiller shutoff valve;

determining cabin cooling needs and battery cooling needs;

operating the cooling system in one of a second chiller only mode, a first chiller only mode, an air conditioning (AC) only mode, a first refrigerant loop only mode, and a dual refrigerant loop mode;

modifying a speed of at least one of the first compressor and the second compressor to satisfy the cabin cooling needs and the battery cooling needs; and determining a combined coefficient of performance (COP) optimization for the first compressor and the second compressor and modifying the speed of the first compressor and the second compressor according to the combined COP optimization.

7. The method of claim 6, further comprising operating the cooling system in the first refrigerant loop only mode;
determining if additional cooling is needed for at least one of the cabin and the battery;
determining a maximum speed of the first compressor; and
adjusting the speed of the first compressor up to the maximum speed of the first compressor to satisfy the cabin cooling needs and the battery cooling needs.

8. The method of claim 7, wherein the maximum speed of the first compressor is determined based on a speed of a blower and a speed of said vehicle.

9. The method of claim 7, further comprising determining an absolute limit for the speed of the first compressor.

10. The method of claim 9, wherein the absolute limit is determined based on at least one of a predetermined limit, a head pressure limit, and a voltage limit.

11. The method of claim 9, further comprising increasing the maximum speed of the first compressor up to the absolute limit.

12. The method of claim 11, further comprising providing a coolant temperature sensor; and
receiving a coolant temperature reading from the coolant temperature sensor; and
increasing the maximum speed of the first compressor based on the received coolant temperature reading.

13. The method of claim 9, further comprising determining a cooling capability of the first refrigerant loop with the first compressor operating at the absolute limit;
determining a combined cooling need of the cabin and the battery;
comparing the cooling capability of the first refrigerant loop with the combined cooling need; and
operating the cooling system in the dual refrigerant loop mode when the combined cooling need exceeds the cooling capability of the first refrigerant loop.

14. A method of operating a cooling system for a vehicle comprising:
providing the cooling system including a coolant loop configured to exchange heat with a battery; a first refrigerant loop comprising a first compressor, an evaporator configured to exchange heat with a cabin of said vehicle, and a first chiller configured to exchange heat with the coolant loop; and a second refrigerant loop comprising a second compressor and a second chiller configured to exchange heat with the coolant loop, wherein the coolant loop comprises a coolant valve for selectively directing or preventing the flow of a coolant between the battery and each of the first chiller and the second chiller;

providing a cooling system controller operably coupled to the first compressor, the second compressor, and the coolant valve;

determining cabin cooling needs and battery cooling needs;

operating the cooling system in a dual refrigerant loop mode;

modifying a speed of at least one of the first compressor and the second compressor to satisfy the cabin cooling needs and the battery cooling needs;

determining if additional cooling is needed for at least one of the cabin and the battery; and determining if the additional cooling is for a cabin cooling request or for a battery cooling request;

determining the speed of the second compressor corresponding to an optimal coefficient of performance (COP);

determining if the second compressor is operating at or above the speed corresponding to the optimal COP; and adjusting the speed of the second compressor up to the speed corresponding to the optimal COP when the additional cooling is for a battery cooling request and the second compressor is operating below the speed corresponding to the optimal COP.

15. The method of claim 14, further comprising adjusting the speed of the first compressor to satisfy the cabin cooling needs when the additional cooling is for a cabin cooling request.

16. The method of claim 14, further comprising determining the speed of the second compressor corresponding to an optimal coefficient of performance (COP);
determining if the second compressor is operating at or above the speed corresponding to the optimal COP;
determining a combined COP optimization for the first compressor and the second compressor; and
adjusting the speed of the first compressor and the second compressor according to the combined COP optimization when the additional cooling is for a battery cooling request and the second compressor is operating at or above the speed corresponding to the optimal COP.

* * * * *